(12) United States Patent  (10) Patent No.: US 12,540,848 B2
Ikeda et al.  (45) Date of Patent: Feb. 3, 2026

(54) ULTRAVIOLET INSPECTION TOOL, ULTRAVIOLET INSPECTION KIT, AND ULTRAVIOLET INSPECTION METHOD

(71) Applicant: FUJIFILM Corporation, Tokyo (JP)

(72) Inventors: Kimi Ikeda, Shizuoka (JP); Daisuke Arioka, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 239 days.

(21) Appl. No.: 18/454,813

(22) Filed: Aug. 24, 2023

(65) Prior Publication Data

US 2023/0392983 A1 Dec. 7, 2023

Related U.S. Application Data

(63) Continuation of application No. PCT/JP2022/004341, filed on Feb. 4, 2022.

(30) Foreign Application Priority Data

Feb. 26, 2021 (JP) .................. 2021-030713
Aug. 20, 2021 (JP) .................. 2021-134874

(51) Int. Cl.
 *G01J 1/50* (2006.01)
 *C09B 67/02* (2006.01)
 (Continued)

(52) U.S. Cl.
 CPC ............ *G01J 1/50* (2013.01); *C09B 67/0065* (2013.01); *C09B 67/0097* (2013.01); *C09K 9/02* (2013.01); *C09K 2211/1018* (2013.01)

(58) Field of Classification Search
 CPC ......... G01J 1/50; G01J 1/429; C09B 67/0065; C09B 67/0097; C09K 9/02; C09K 2211/1018
 See application file for complete search history.

(56) References Cited

U.S. PATENT DOCUMENTS 4,829,187 A 5/1989 Tomita et al.
5,296,275 A * 3/1994 Goman ................ C09D 11/50
 430/338
(Continued)

FOREIGN PATENT DOCUMENTS

JP S6089352 5/1985
JP S62112020 5/1987
(Continued)

OTHER PUBLICATIONS

Shirai et al. "Photoacid and Photobase Generators: Chemistry and Applications to Polymeric Materials", Elsevier Science Ltd, Prog. Polym. Sci., vol. 21, 1996, p. 1-45 (Year: 1996).*
(Continued)

*Primary Examiner* — Edwin C Gunberg
*Assistant Examiner* — Mamadou Faye
(74) *Attorney, Agent, or Firm* — JCIPRNET

(57) ABSTRACT

The present invention provides an ultraviolet inspection tool having excellent color formability with respect to light having a wavelength of 222 nm even in a case where an irradiation amount of the light having a wavelength of 222 nm is small, an ultraviolet inspection kit, and an ultraviolet inspection method. The ultraviolet inspection tool of the present invention is an ultraviolet inspection tool including an ultraviolet-sensing layer containing a color-forming agent and an acid generator, in which the color-forming agent has at least one selected from the group consisting of a lactone structure, a lactam structure, a sultone structure, a sultine structure, a ring-opened structure of these structures, and an azobenzene structure, a molecular weight of the acid generator is 600 or less, and a mass ratio of a content of the acid generator to a content of the color-forming agent is 1.01 to 40.00.

20 Claims, 1 Drawing Sheet

(51) Int. Cl.
*C09B 67/20* (2006.01)
*C09K 9/02* (2006.01)

(56) References Cited

U.S. PATENT DOCUMENTS

| | | | |
|---|---|---|---|
| 5,411,835 | A | 5/1995 | Brinser |
| 6,524,763 | B1 | 2/2003 | Kuroda et al. |
| 2009/0194708 | A1* | 8/2009 | Studer .................. G03F 7/0045 250/474.1 |
| 2010/0327267 | A1* | 12/2010 | Anryu .................. H05B 33/14 438/46 |
| 2017/0131144 | A1* | 5/2017 | Hatta ..................... G01J 1/429 |
| 2018/0169279 | A1 | 6/2018 | Randers-Pehrson et al. |
| 2019/0321499 | A1 | 10/2019 | Igarashi |
| 2020/0085984 | A1 | 3/2020 | Randers-Pehrson et al. |
| 2020/0215215 | A1 | 7/2020 | Randers-Pehrson et al. |
| 2020/0306397 | A1 | 10/2020 | Randers-Pehrson et al. |
| 2020/0353112 | A1 | 11/2020 | Randers-Pehrson et al. |
| 2021/0236672 | A1 | 8/2021 | Randers-Pehrson et al. |
| 2022/0288247 | A1 | 9/2022 | Igarashi |

FOREIGN PATENT DOCUMENTS

| | | |
|---|---|---|
| JP | H01272930 | 10/1989 |
| JP | H07508789 | 9/1995 |
| JP | 2001242249 | 9/2001 |
| JP | 2010501655 | 1/2010 |
| JP | 2018517488 | 7/2018 |
| JP | 2019187727 | 10/2019 |
| WO | 2016017701 | 2/2016 |

OTHER PUBLICATIONS

"Search Report of Europe Counterpart Application", issued on Jul. 1, 2024, p. 1-p. 8.

Wikipedia, "Bromophenol blue", accessed on Jun. 2024, available at: https://en.wikipedia.org/wiki/Bromophenol_blue.

Masamitsu Shirai et al., "Photoacid and photobase generators: Chemistry and applications to polymeric materials", Progress in Polymer Science, vol. 21, Jan. 1996, pp. 1-45.

"International Search Report (Form PCT/ISA/210) of PCT/JP2022/004341", mailed on Apr. 26, 2022, with English translation thereof, pp. 1-6.

"Written Opinion of the International Searching Authority (Form PCT/ISA/237) of PCT/JP2022/004341", mailed on Apr. 26, 2022, with English translation thereof, pp. 1-8.

"Office Action of Japan Counterpart Application", issued on Sep. 30, 2025, with English translation thereof, pp. 1-7.

* cited by examiner

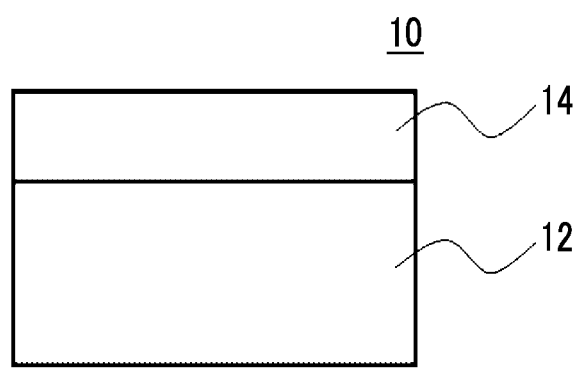

ULTRAVIOLET INSPECTION TOOL, ULTRAVIOLET INSPECTION KIT, AND ULTRAVIOLET INSPECTION METHOD

CROSS-REFERENCE TO RELATED APPLICATIONS

This application is a Continuation of PCT International Application No. PCT/JP2022/004341 filed on Feb. 4, 2022, which claims priority under 35 U.S.C. § 119(a) to Japanese Patent Application No. 2021-030713 filed on Feb. 26, 2021 and Japanese Patent Application No. 2021-134874 filed on Aug. 20, 2021. The above applications are hereby expressly incorporated by reference, in their entirety, into the present application.

BACKGROUND OF THE INVENTION

1. Field of the Invention

The present invention relates to an ultraviolet inspection tool, an ultraviolet inspection kit, and an ultraviolet inspection method.

2. Description of the Related Art

A measurement of an amount of ultraviolet irradiation has been carried out in various fields. Specific examples thereof include a measurement of an amount of ultraviolet irradiation to an object to be irradiated in a curing reaction of an ultraviolet curing resin, and a measurement of an amount of ultraviolet irradiation to an object to be irradiated in an ultraviolet sterilization of food or the like.

On the other hand, in recent years, novel coronavirus infection (COVID-19) has been a major social problem.

In such a situation, as a member related to an ultraviolet inspection tool, JP2001-242249A discloses "a microcapsule containing (a) a leuco compound and (b) a radiation-sensitive composition containing an organic halogen compound as an essential component", and JP1987-112020A (JP-S62-112020A) discloses "an ultraviolet-sensitive composition containing a photoactivator which generates free radicals by irradiation with ultraviolet rays, a discoloring agent which exhibits a visible color change due to action of the free radicals, and an ultraviolet absorber".

SUMMARY OF THE INVENTION

Since light (ultraviolet rays) having a wavelength of 222 nm are effective in inactivating the novel coronavirus, for example, by irradiating light having a wavelength of 222 nm to a member which is touched by an unspecified number of people, such as a doorknob and a touch panel, it is possible to prevent the infection with the novel coronavirus.

Therefore, there is a demand for an inspection tool capable of inspecting whether or not light having a wavelength of 222 nm is emitted. In this case, it is desirable that the ultraviolet inspection tool is capable of sufficiently forming color even in a case where an irradiation of light having a wavelength of 222 nm is low (for example, an irradiation amount of 1 to 3 mJ/cm 2).

Regarding the ultraviolet inspection tool using the members disclosed in JP2001-242249A and JP1987-112020A (JP-S62-112020A), in a case of evaluating color formability with respect to light having a wavelength of 222 nm, which inactivates the novel coronavirus, the present inventors have found that there is room for improvement in the color formability with respect to the light having a wavelength of 222 nm in a case where the irradiation amount of light having a wavelength of 222 nm is small.

In view of the above-described circumstances, an object of the present invention is to provide an ultraviolet inspection tool having excellent color formability with respect to light having a wavelength of 222 nm even in a case where an irradiation amount of the light having a wavelength of 222 nm is small.

Another object of the present invention is to provide an ultraviolet inspection kit and an ultraviolet inspection method.

As a result of intensive studies to achieve the above-described objects, the present inventors have found that the above-described objects can be achieved by the following configurations, and have completed the present invention.

[1]
An ultraviolet inspection tool comprising:
an ultraviolet-sensing layer containing a color-forming agent and an acid generator,
in which the color-forming agent has at least one selected from the group consisting of a lactone structure, a lactam structure, a sultone structure, a sultine structure, a ring-opened structure of these structures, and an azobenzene structure,
a molecular weight of the acid generator is 600 or less, and
a mass ratio of a content of the acid generator to a content of the color-forming agent is 1.01 to 40.00.

[2]
The ultraviolet inspection tool according to [1],
in which the color-forming agent includes at least one selected from the group consisting of a compound represented by Formula (I) described later, a compound represented by Formula (II) described later, and a ring-opened compound of these compounds.

[3]
The ultraviolet inspection tool according to [1],
in which the color-forming agent includes at least one selected from the group consisting of a compound represented by Formula (I) described later, a compound represented by Formula (III) described later, and a ring-opened compound of these compounds, and
the mass ratio of the content of the acid generator to the content of the color-forming agent is 2.01 to 40.00.

[4]
The ultraviolet inspection tool according to [1],
in which the color-forming agent includes at least one selected from the group consisting of a compound represented by Formula (IV) described later or a ring-closed compound of the compound, and a compound represented by Formula (V) described later.

[5]
The ultraviolet inspection tool according to any one of [1] to [4],
in which the acid generator includes a compound which generates at least one acid selected from the group consisting of HBr, HI, $HPF_6$, $HSbF_6$, and perfluorosulfonic acid.

[6]
The ultraviolet inspection tool according to any one of [1] to [5],
in which the acid generator includes at least one selected from the group consisting of an organic halogen compound, a sulfonium salt compound, and an iodonium salt compound.

[7]
The ultraviolet inspection tool according to [6], in which the acid generator includes at least one selected from the group consisting of a compound represented by Formula (1) described later and a triarylsulfonium salt compound.

[8]
The ultraviolet inspection tool according to any one of [1] to [7], in which the color-forming agent has a maximal absorption wavelength in a wavelength range of 200 to 230 nm.

[9]
The ultraviolet inspection tool according to any one of [1] to [8], in which the mass ratio of the content of the acid generator to the content of the color-forming agent is 3.00 to 35.00.

[10]
The ultraviolet inspection tool according to any one of [1] to [9], further comprising:
a binder,
in which the binder substantially has no aromatic ring.

[11]
The ultraviolet inspection tool according to any one of [1] to [10], in which the ultraviolet-sensing layer further contains a microcapsule, and
the microcapsule contains the color-forming agent and the acid generator.

[12]
The ultraviolet inspection tool according to any one of [1] to [11], in which a content of the color-forming agent is 0.010 to 1.000 $g/m^2$ per unit area of the ultraviolet-sensing layer.

[13]
The ultraviolet inspection tool according to any one of [1] to [12], in which the ultraviolet inspection tool senses ultraviolet rays with a wavelength of 180 to 230 nm.

[14]
An ultraviolet inspection kit comprising:
the ultraviolet inspection tool according to any one of [1] to [13].

[15]
An ultraviolet inspection method comprising:
inspecting ultraviolet rays with a wavelength of 180 to 230 nm using the ultraviolet
inspection tool according to any one of [1] to [13].

According to the present invention, it is possible to provide an ultraviolet inspection tool having excellent color formability with respect to light having a wavelength of 222 nm even in a case where an irradiation amount of the light having a wavelength of 222 nm is small.

In addition, according to the present invention, it is possible to provide an ultraviolet inspection kit and an ultraviolet inspection method.

BRIEF DESCRIPTION OF THE DRAWINGS

FIG. 1 is a schematic cross-sectional view showing an example of the ultraviolet inspection tool according to the embodiment of the present invention.

DESCRIPTION OF THE PREFERRED EMBODIMENTS

Hereinafter, the present invention will be described in detail.

The description of the configuration requirements of the present invention described below is made on the basis of representative embodiments of the present invention, but it should not be construed that the present invention is limited to those embodiments.

In the present specification, the numerical ranges shown using "to" indicate ranges including the numerical values described before and after "to" as the lower limit and the upper limit.

Regarding numerical ranges that are described stepwise in the present specification, an upper limit or a lower limit described in a numerical range may be replaced with an upper limit or a lower limit of another stepwise numerical range. In addition, in the numerical range described in the present specification, an upper limit and a lower limit described in a certain numerical range may be replaced with values shown in Examples.

In the present specification, "solid content" means a component forming a composition layer formed of a composition (for example, ultraviolet-sensing layer and the like), and in a case where the composition (for example, a composition for forming an ultraviolet-sensing layer, and the like) contains a solvent (for example, organic solvent, water, and the like), the "solid content" means all components excluding the solvent. In addition, in a case where the components are components which form a composition layer (for example, an ultraviolet-sensing layer and the like), the components are considered to be solid contents even in a case where the components are liquid components.

In the present specification, "ultraviolet rays" mean light having a wavelength range of to 400 nm.

In the present specification, "(meth)acrylic" means at least one of acrylic or methacrylic.

In the present specification, "boiling point" means a boiling point at a standard atmospheric present.

[Ultraviolet Inspection Tool]

The ultraviolet inspection tool according to the embodiment of the present invention is an ultraviolet inspection tool including an ultraviolet-sensing layer containing a color-forming agent and an acid generator, in which the color-forming agent has at least one selected from the group consisting of a lactone structure, a lactam structure, a sultone structure, a sultine structure, a ring-opened structure of these structures, and an azobenzene structure, a molecular weight of the acid generator is 600 or less, and a mass ratio of a content of the acid generator to a content of the color-forming agent is 1.01 to 40.00.

Hereinafter, the color-forming agent has at least one selected from the group consisting of a lactone structure, a lactam structure, a sultone structure, a sultine structure, a ring-opened structure of these structures, and an azobenzene structure is also referred to as "specific color-forming agent". In addition, the acid generator having a molecular weight of 600 or less is also referred to as "specific acid generator".

Although the detailed mechanism by which the ultraviolet inspection tool according to the embodiment of the present invention is excellent in color formability with respect to light having a wavelength of 222 nm with a low irradiation amount is not clear, the present inventors have presumed as follows.

A feature point of the present invention is, for example, that the specific acid generator and the specific color-forming agent are contained, and the mass ratio of the content of the specific acid generator to the content of the specific color-forming agent is within a predetermined range.

In color-forming agents which have been generally used in the related art, in order to improve color formability with respect to ultraviolet rays with a wavelength of 254 nm and a wavelength of 365 nm, it has been common to use high amounts of the color-forming agent. On the other hand, in a case of the light having a wavelength of 222 nm, since the color-forming agent itself absorbs a lot of the light having a wavelength of 222 nm, the present inventors have found that, depending on the amount of the color-forming agent, the color formability may decrease with a small irradiation amount.

Therefore, as a result of intensive studies, the present inventors have found that, in a case where the specific color-forming agent and the specific acid generator are contained, and the mass ratio of the content of the specific acid generator to the content of the specific color-forming agent is 1.01 to 40.00, the ultraviolet inspection tool according to the embodiment of the present invention is excellent in color formability even with a small irradiation amount in a case of being irradiated with the light having a wavelength of 222 nm.

the reaction from the ring-closed body to the ring-opened body and the reaction from the ring-opened body to the ring-closed body is more biased toward the reaction from the ring-closed body to the ring-opened body. Therefore, it is considered that, in a case where the amount of the specific color-forming agent X is relatively small, it is easy to promote the generation of the ring-opened body exhibiting color, and the color formability is improved. In addition, since the amount of the specific color-forming agent X can be relatively reduced, it is considered that the absorption of light by the specific color-forming agent X itself can be suppressed, and as a result, the generation of acid from the specific acid generator proceeds efficiently, leading to improvement in color formability. In a case where the above-described mass ratio disclosed is less than 1.01, as disclosed in the prior art, the bias toward the reaction from the ring-closed body to the ring-opened body is not sufficient, and the color formability is deteriorated.

In addition, in a case where the above-described mass ratio is 40.0 or less, it is presumed that the amount of the specific color-forming agent is not too small, and the color optical density is excellent.

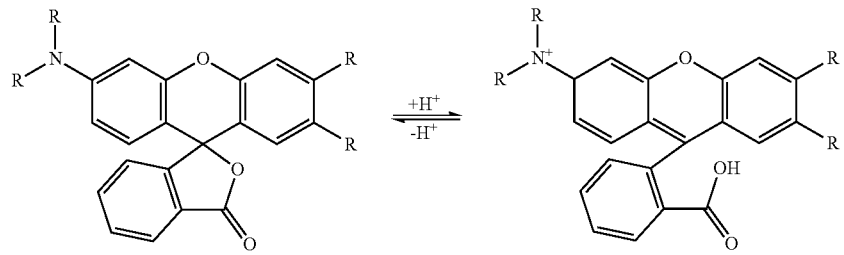

The reason is not clear, but the present inventors have presumed as follows.

First, it is considered that a main color-forming mechanism of the present invention is that the specific acid generator absorbs ultraviolet rays and activates to generate an acid, a structure of the color-forming agent is changed as described later by being reacted with the generated acid or the like, and the color changes.

More specifically, the specific color-forming agent used in the present invention has a predetermined structure as described later, and the structure thereof can be reversibly changed. For example, as shown in the following scheme, a specific color-forming agent X having the following lactone structure can be a ring-closed body which is substantially colorless and a ring-opened body which is colored. More specifically, in the specific color-forming agent X, the lactone structure is ring-opened by action of acid (H⁺) to be a ring-opened body, and is ring-closed by deoxidization to be a ring-closed body. In a case where an acid is supplied to the ring-closed body of the specific color-forming agent X, the reaction from the ring-closed body to the ring-opened body proceeds, and at the same time, the reaction from the ring-opened body to the ring-closed body also proceeds. That is, the reaction from the ring-closed body to the ring-opened body and the reaction from the ring-opened body to the ring-closed body proceed reversibly. In the present invention, since the mass ratio of the content of the specific acid generator to the content of the specific color-forming agent is 1.01 or more and the amount of acid which can react with the specific color-forming agent X is large, the reaction from the ring-closed body to the ring-opened body proceeds more easily. In other words, equilibrium between Although the compound having a lactone structure has been described in detail above, the same mechanism can be presumed for a compound having another structure.

For example, as shown in the following scheme, a specific color-forming agent Y having the following sultone structure can be a ring-opened body exhibiting blue color and a ring-closed body exhibiting yellow color. More specifically, More specifically, the specific color-forming agent Y is ring-closed by action of acid (H⁺) to be a ring-closed body, and is ring-opened by deoxidization to be a ring-opened body. In a case where an acid is supplied to the ring-opened body of the specific color-forming agent Y, the reaction from the ring-opened body to the ring-closed body proceeds, and at the same time, the reaction from the ring-closed body to the ring-opened body also proceeds. That is, the reaction from the ring-opened body to the ring-closed body and the reaction from the ring-closed body to the ring-opened body proceed reversibly. In the present invention, since the mass ratio of the content of the specific acid generator to the content of the specific color-forming agent is 1.01 or more and the amount of acid which can react with the specific color-forming agent Y is large, the reaction from the ring-opened body to the ring-closed body proceeds more easily. In other words, equilibrium between the reaction from the ring-opened body to the ring-closed body and the reaction from the ring-closed body to the ring-opened body is more biased toward the reaction from the ring-opened body to the ring-closed body. As a result, the color formability is excellent.

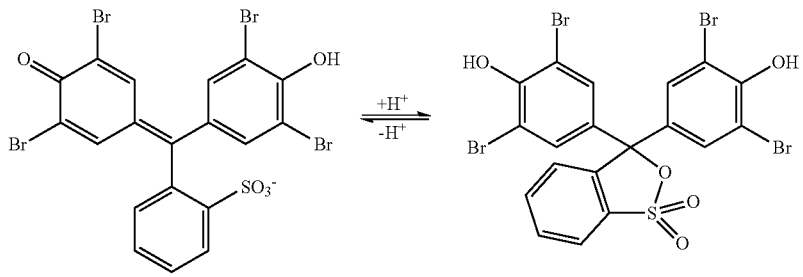

Furthermore, as shown in the following scheme, a specific color-forming agent Z having the following azobenzene structure can be an azo body exhibiting yellow color and a hydrazone body exhibiting orange to pink color. More specifically, More specifically, the specific color-forming agent Z is to be a hydrazone body by action of acid ($H^+$), and is to be an azo body by deoxidization. In a case where an acid is supplied to the azo body of the specific color-forming agent Z, the reaction from the azo body to the hydrazone body proceeds, and at the same time, the reaction from the hydrazone body to the azo body also proceeds. That is, the reaction from the azo body to the hydrazone body and the reaction from the hydrazone body to the azo body proceed reversibly. In the present invention, since the mass ratio of the content of the specific acid generator to the content of the specific color-forming agent is 1.01 or more and the amount of acid which can react with the specific color-forming agent Z is large, the reaction from the azo body to the hydrazone body proceeds more easily. In other words, equilibrium between the reaction from the azo body to the hydrazone body and the reaction from the hydrazone body to the azo body is more biased toward the reaction from the azo body to the hydrazone body. As a result, the color formability is excellent.

shape can be used. In addition, the sheet-like ultraviolet inspection tool may include a long shape.

The ultraviolet inspection tool may include other members. In a case where the ultraviolet inspection tool has other members, the ultraviolet inspection tool may be attached to the other members through an adhesive layer (for example, a pressure sensitive adhesive, an adhesive, and the like), or the ultraviolet inspection tool may be manufactured as a part of other members. Examples of the other members include a business card, a name tag, a mask, a cloth product (for example, a shirt), a case (for example, a smartphone case), and a paper product (for example, a notebook, a calendar, and the like).

In a case where the ultraviolet-sensing layer included in the ultraviolet inspection tool is irradiated with ultraviolet rays for measuring an amount of ultraviolet irradiation, in a region irradiated with ultraviolet rays (ultraviolet-irradiated region), a color optical density or color changes according to the amount of ultraviolet irradiation (for example, integrated illuminance and the like). The fact that the color is formed at the color optical density corresponding to the amount of ultraviolet irradiation, or that the color is changed means that a colored part has gradation properties according to the amount of ultraviolet irradiation.

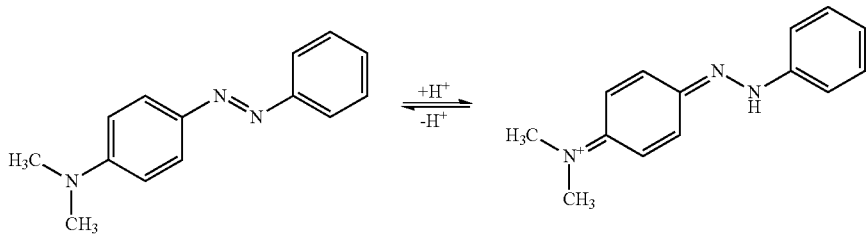

Hereinafter, the fact that the color formability with respect to light having a wavelength 222 nm is more excellent even in a case where the irradiation amount of the light having a wavelength of 222 nm is small is also referred to "effect of the present invention is more excellent".

A form of the ultraviolet inspection tool may be a sheet-like shape, and various shapes such as a block shape, for example, a rectangular parallelepiped shape, a cylindrical shape, and the like can be used. Among these, a sheet-like ultraviolet inspection tool, that is, an ultraviolet inspection sheet is suitably used.

In addition, as the shape of the sheet-like ultraviolet inspection tool, various shapes such as a square shape, a rectangular shape, a circular shape, an elliptical shape, a polygonal shape other than a quadrangular shape, for example, a hexagonal shape and the like, and an amorphous Hereinafter, specific embodiments of the ultraviolet inspection tool will be described in detail.

As the embodiment of the ultraviolet inspection tool, a first embodiment described later or a second embodiment described later is preferable.

The ultraviolet inspection tool may contain a microcapsule, and preferably contains a microcapsule containing the specific color-forming agent and the specific acid generator.

First Embodiment

The first embodiment of the ultraviolet inspection tool is an embodiment in which the microcapsule described later is not contained.

FIG. 1 is a schematic cross-sectional view of an example of the ultraviolet inspection tool.

The first embodiment of an ultraviolet inspection tool 10 includes a support 12 and an ultraviolet-sensing layer 14 disposed on one surface of the support 12. The above-described ultraviolet-sensing layer 14 contains the specific color-forming agent and the specific acid generator. In the ultraviolet-sensing layer 14 which is irradiated with ultraviolet rays, a colored part (not shown) which forms color with a color optical density corresponding to an amount of ultraviolet irradiation is formed.

As described above, although FIG. 1 shows an aspect in which the ultraviolet inspection tool is a sheet-like shape, the present invention is not limited to this aspect.

As will be described later, it is sufficient that the ultraviolet inspection tool 10 includes the ultraviolet-sensing layer 14, and the support 12 may not be included.

Furthermore, the ultraviolet inspection tool 10 shown in FIG. 1 has a two-layer configuration of the support 12 and the ultraviolet-sensing layer 14, but the present invention is not limited to this aspect. As will be described later, the ultraviolet inspection tool 10 may include a layer other than the support 12 and the ultraviolet-sensing layer 14 (for example, a reflective layer, a glossy layer, a filter layer, and the like).

A thickness of the ultraviolet inspection tool 10 is preferably 5 μm to 1 cm, and more preferably 25 μm to 2 mm.

Hereinafter, each member included in the first embodiment of the ultraviolet inspection tool will be described in detail.

[Ultraviolet-Sensing Layer]

The ultraviolet inspection tool has an ultraviolet-sensing layer.

The ultraviolet-sensing layer contains the specific color-forming agent and the specific acid generator.

Hereinafter, various components which can be contained in the ultraviolet-sensing layer will be described in detail.

<Specific Color-Forming Agent>

The ultraviolet-sensing layer contains the specific color-forming agent.

The "color-forming agent" means a compound which colors, discolors, or is decolorized.

That is, the "color-forming" is a concept including coloration, discoloration, and decolorization. The "coloration" means coloring from a state of being substantially colorless (a state in which it is colorless or exhibits a light color). The "discoloration" means that color changes from a specific colored state to a colored state different from the specific colored state (for example, a change in color from yellow to red). In addition, the "decolorization" means a change from a specific colored state to a state of being substantially colorless (a state in which it is colorless or exhibits a light color).

It is preferable that the specific color-forming agent forms color by action of acid.

The acid which acts on the specific color-forming agent to form color may be an acid generated from the specific acid generator or an acid other than the acid generated from the specific acid generator.

Whether or not the specific color-forming agent forms color by the action of acid can be measured, for example, by the following method.

An ultraviolet-sensing layer before light irradiation is cut out from the ultraviolet inspection tool, and the ultraviolet-sensing layer is immersed in methanol for 2 days to obtain a methanol solution A in which the color-forming agent has been extracted. Thereafter, the methanol solution A is analyzed using liquid chromatography (analysis 1). A lid or the like is provided to prevent the methanol from volatilizing while the ultraviolet-sensing layer is immersed in the methanol.

On the other hand, 0.01 mol/L (1 N) hydrochloric acid is added to the methanol solution to adjust the pH to 1, and analysis is performed using liquid chromatography in the same manner as in the analysis 1 (analysis 2).

The data (maximal absorption wavelength) obtained in the analysis 1 and the data (maximal absorption wavelength) obtained in the analysis 2 are compared with each other, and it is confirmed whether or not the maximal absorption wavelength has changed. In a case where the maximal absorption wavelength has changed, it means that the coloration occurs by acid. The maximal absorption wavelength is preferably changed to a wavelength of 10 nm or more. In addition, in many cases, the color is visually changed between before the pH is adjusted to 1 by adding 0.01 mol/L (1 N) hydrochloric acid and after the adjustment of pH.

Measurement conditions of the liquid chromatography are as follows.

Equipment: Nexera (manufactured by Shimadzu Corporation)
Column: Capcell pak C18 UG-120
Eluent: water/methanol
Oven: 40° C.
Injection: 5 μL
Flow Rate: 0.2 mL/min The specific color-forming agent has at least one selected from the group consisting of a lactone structure, a lactam structure, a sultone structure, a sultine structure, a ring-opened structure of these structures, and an azobenzene structure.

In many cases, the specific acid generator is oil-soluble, and from the viewpoint that the specific color-forming agent and the specific acid generator are likely to mix and react with each other, it is preferable that the specific color-forming agent is also oil-soluble.

In addition, from the same viewpoint as described above, it is more preferable that the specific color-forming agent has at least one selected from the group consisting of a lactone structure, a lactam structure, and a ring-opened structure thereof, and it is still more preferable to have a phthalide structure or an isoindolin-1-one structure.

In a case where a compound described in the present specification has isomers (for example, a structural isomer, a stereoisomer, and the like), unless otherwise specified, the compound includes those isomers. For example, in a case of having "azobenzene structure", it means to include both the azobenzene structure and its tautomeric structure (for example, a hydrazone structure and the like). In addition, even in a compound represented by Formula (V) described later, unless otherwise specified, it is also intended to include a compound having a tautomer structure of the compound represented by Formula (V).

The specific color-forming agent is preferably a leuco coloring agent.

Examples of the leuco coloring agent include a triarylmethanephthalide-based compound having a triarylmethane structure and a phthalide structure, a fluoran-based compound having a xanthene structure and a phthalide structure, an indolylphthalide-based compound having an indolyl structure and a phthalide structure, an azaindolylphthalide-based compound having an azaindolyl structure and a phthalide structure, and a rhodamine lactam-based compound having a xanthene structure and a lactam structure.

The specific color-forming agent preferably includes at least one selected from the group consisting of a fluoran-based compound, an indolylphthalide-based compound, an azaindolylphthalide-based compound, and a rhodamine lactam-based compound, and more preferably includes an indolylphthalide-based compound.

It is preferable that the specific color-forming agent includes at least one selected from the group consisting of a compound represented by Formula (I), a compound represented by Formula (II), and a ring-opened compound of these compounds.

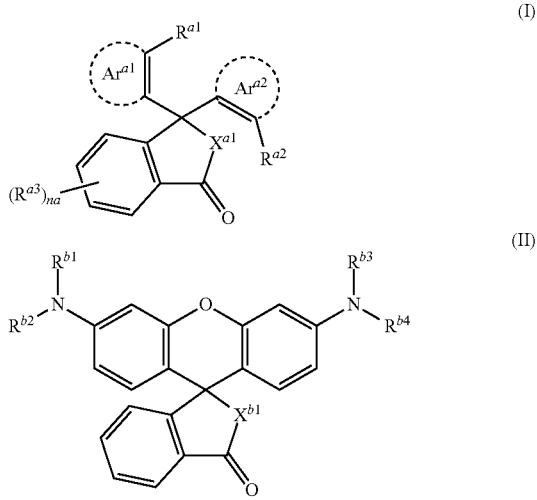

In Formula (I), $Ar^{a1}$ and $Ar^{a2}$ each independently represent an aromatic ring which may have a substituent. $R^{a1}$ and $R^{a2}$ each independently represent an alkyl group which may have a substituent. Rai represents a substituent. $X^{a1}$ represents —O— or —$NR^{a4}$—. Rao represents a hydrogen atom, an alkyl group which may have a substituent, or an aryl group which may have a substituent. na represents an integer of 0 to 4.

In Formula (II), $R^{b1}$ to $R^{b3}$ each independently represent a hydrogen atom, an alkyl group which may have a substituent, or an aryl group which may have a substituent. $R^{b2}$ and $R^{b4}$ each independently represent an alkyl group which may have a substituent or an aryl group which may have a substituent. $X^{b1}$ represents —$NR^{b5}$—. $R^{b5}$ represents a hydrogen atom, an alkyl group which may have a substituent, or an aryl group which may have a substituent.

$Ar^{a1}$ and $Ar^{a1}$ each independently represent an aromatic ring which may have a substituent. The above-described aromatic rings represented by $Ar^{a1}$ and $Ar^{a2}$ each include two carbon atoms (C=C) described in Formula (I).

The above-described aromatic ring which may have a substituent may be monocyclic or polycyclic.

Examples of the above-described aromatic ring which may have a substituent include an aromatic hydrocarbon ring which may have a substituent and an aromatic heterocyclic ring which may have a substituent, and an aromatic heterocyclic ring which may have a substituent is preferable.

Examples of the substituent which may be included in the above-described aromatic ring which may have a substituent include an alkyl group, an aryl group, and a heteroaryl group, and an alkyl group is preferable. The above-described group may further have a substituent. The above-described substituent is a group other than $R^{a1}$ and $R^{a2}$.

The above-described alkyl group may be linear, branched, or cyclic, and is preferably linear or branched.

The number of carbon atoms in the above-described alkyl group is preferably 1 to 20 and more preferably 5 to 10.

The number of ring members in the above-described aromatic ring which may have a substituent is preferably 6 to 30, more preferably 6 to 18, and still more preferably 6 to 12.

Examples of the above-described aromatic ring which may have a substituent include aromatic hydrocarbon rings such as a benzene ring, a naphthalene ring, an anthracene ring, and a phenanthrene ring, which may have a substituent; and aromatic heterocyclic rings such as an indole ring, a pyrrole ring, a pyrazole ring, a triazole ring, a pyridine ring, a pyrazine ring, a pyrimidine ring, a pyridazine ring, a thiophene ring, a furan ring, a pyran ring, a thiazole ring, an oxazole ring, a selenophene ring, and an imidazole ring, which may have a substituent. Among these, an aromatic heterocyclic ring which may have a substituent is preferable, and an indole ring which may have a substituent is more preferable.

$Ar^{a1}$ and $Ar^{a2}$ may be the same group or different groups, and preferably represent the same group.

$R^{a1}$ and $R^{a2}$ each independently represent an alkyl group which may have a substituent.

The above-described alkyl group which may have a substituent may be linear, branched, or cyclic.

The number of carbon atoms in the above-described alkyl group which may have a substituent is preferably 1 to 10 and more preferably 1 to 3.

Examples of the substituent which may be included in the above-described alkyl group which may have a substituent include an aryl group and a heteroaryl group, and the above-described alkyl group is preferably an alkyl group having no substituent (unsubstituted alkyl group).

The compound represented by Formula (I) has $R^{a1}$ and $R^{a2}$ at predetermined positions.

By having $R^{a1}$ and $R^{a2}$ at predetermined positions, since the deoxidation reaction from the ring-opened body to the ring-closed body is less likely to proceed, it is considered that the reaction from the ring-closed body to the ring-opened body proceeds efficiently, and as a result, the effect of the present invention is more excellent.

In Formula (I), a 5-membered ring including $X^{a1}$ and the aromatic ring which may have a substituent, represented by $Ar^{a1}$ and $Ar^{a2}$, are bonded to each other. In the aromatic ring which may have a substituent, represented by $Ar^{a1}$ and $Ar_{a2}$, $R^{a1}$ and $R^{a2}$ are bonded to carbon atoms adjacent to the carbon atom (ring member atom of each ring) forming the above-described atom.

Hereinafter, specific examples thereof will be described in detail with a compound (A) and a compound (B). The compound (A) corresponds to the compound represented by Formula (I), and the compound (B) does not correspond to the compound represented by Formula (I). In the compound (A), $R^{a1}$ and $R^{a2}$ in Formula (I) correspond to a methyl group. That is, it means that, in Formula (I), $R^{a1}$ and $R^{a2}$ are at the position of the methyl group in the compound (A). In addition, since the compound (B) does not have $R^{a1}$ and $R^{a2}$ at predetermined positions, the compound (B) does not correspond to the compound represented by Formula (I).

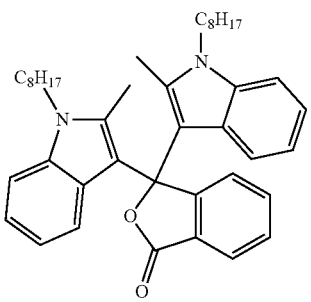

(A)

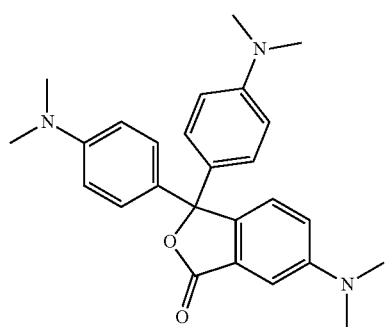

(B)

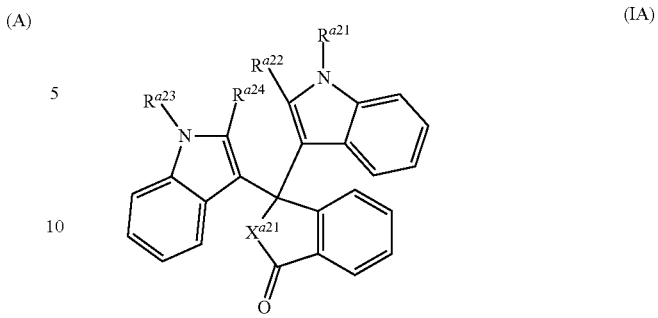

(IA)

In Formula (IA), $R^{a22}$ and $R^{a24}$ each independently represent an alkyl group which may have a substituent. $R^{a21}$ and $R^{a23}$ each independently represent a hydrogen atom or an alkyl group which may have a substituent. $X^{a21}$ represents —O— or —$NR^{a25}$—. $R^{a25}$ represents a hydrogen atom, an alkyl group which may have a substituent, or an aryl group which may have a substituent.

$R^{a22}$ and $R^{a24}$ each independently represent an alkyl group which may have a substituent. $R^{a21}$ and $R^{a23}$ each independently represent a hydrogen atom or an alkyl group which may have a substituent.

Examples of the above-described alkyl group which may have a substituent include the alkyl group which may be included in the aromatic ring which may have a substituent, represented by $Ar^{a1}$ and $Ar^{a2}$. As $R^{a21}$ to $R^{a23}$, an alkyl group which may have a substituent is preferable, and an alkyl group having no substituent (unsubstituted alkyl group) is more preferable.

The alkyl group which may have a substituent, represented by $R^{a22}$ and $R^{a24}$, is the same as $R^{a1}$ and $R_{a2}$ described above, and a suitable range thereof is also the same.

$X^{a21}$ represents —O— or —$NR^{a25}$—. $R^{a25}$ represents a hydrogen atom, an alkyl group which may have a substituent, or an aryl group which may have a substituent.

$X^{a21}$ and $R^{a25}$ are the same as $X^{a1}$ and Rao described above, and suitable ranges thereof are also the same.

Hereinafter, the compound represented by Formula (II) will be described in detail.

$R^{b1}$ and $R^{b3}$ each independently represent a hydrogen atom, an alkyl group which may have a substituent, or an aryl group which may have a substituent. $R^{b2}$ and $R^{b4}$ each independently represent an alkyl group which may have a substituent or an aryl group which may have a substituent.

The above-described alkyl group which may have a substituent may be linear, branched, or cyclic, and is preferably linear or branched.

The number of carbon atoms in the above-described alkyl group which may have a substituent is preferably 1 to 10 and more preferably 1 to 5.

Examples of the above-described aryl group which may have a substituent include the above-described aryl group which may have a substituent, represented by $R^{a4}$.

Examples of the substituent which may be included in the above-described alkyl group which may have a substituent and the above-described aryl group which may have a substituent include the substituent represented by $R^{a3}$ described above.

As $R^{b1}$ to $R^{b4}$, an alkyl group which may have a substituent is preferable, and it is more preferable to be an alkyl group having no substituent (unsubstituted alkyl group).

$R^{a3}$ represents a substituent.

Examples of the above-described substituent include a halogen atom, a cyano group, a nitro group, a carboxy group, an alkyl group, an aryl group, and a group obtained by combining these groups. In a case where a plurality of $R^{a3}$'s are present, the $R_{a3}$'s may be the same or different from each other.

$X^{a1}$ represents —O— or —$NR^{a4}$—. $R^{a4}$ represents a hydrogen atom, an alkyl group which may have a substituent, or an aryl group which may have a substituent.

$X^{a1}$ is preferably —O—.

Examples of the above-described alkyl group which may have a substituent include the above-described alkyl group which may have a substituent, represented by $R^{a1}$ and $R^{a2}$.

The above-described aryl group which may have a substituent may be monocyclic or polycyclic.

The number of carbon atoms in the above-described aryl group which may have a substituent is preferably 6 to 20.

Examples of the substituent which may be included in the above-described alkyl group which may have a substituent and the above-described aryl group which may have a substituent include the substituent represented by $R^{a3}$ described above.

na represents an integer of 0 to 4.

na is preferably an integer of 0 to 2, and more preferably 0. In other words, it is preferable that the compound represented by Formula (I) does not have $R^{a3}$.

As the compound represented by Formula (I), a compound represented by Formula (IA) is preferable.

$X^{b1}$ represents —$NR^{b5}$—. $R^{b5}$ represents a hydrogen atom, an alkyl group which may have a substituent, or an aryl group which may have a substituent.

$R^{b5}$ is the same as $R^{a4}$ described above, and a suitable aspect thereof is also the same.

It is also preferable that the specific color-forming agent includes at least one selected from the group consisting of the compound represented by Formula (I), a compound represented by Formula (III), and a ring-opened compound of these compounds.

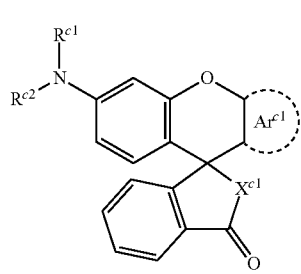

(III)

In Formula (III), $Ar^{c1}$ represents an aromatic ring which may have a substituent. $R^{c1}$ represents a hydrogen atom, an alkyl group which may have a substituent, or an aryl group which may have a substituent. $R^{c2}$ represents an alkyl group which may have a substituent or an aryl group which may have a substituent. $X^{c1}$ represents —O— or —$NR^{c3}$—. $R^{c3}$ represents a hydrogen atom, an alkyl group which may have a substituent, or an aryl group which may have a substituent.

$Ar^{c1}$ represents an aromatic ring which may have a substituent.

The above-described aromatic ring which may have a substituent may be monocyclic or polycyclic.

Examples of the above-described aromatic ring which may have a substituent include an aromatic hydrocarbon ring which may have a substituent and an aromatic heterocyclic ring which may have a substituent, and an aromatic hydrocarbon ring which may have a substituent is preferable.

Examples of the substituent which may be included in the above-described aromatic ring which may have a substituent include an alkyl group, —$NR^{N1}R^{N2}$, an aryl group, and a heteroaryl group, and an alkyl group or —$NR^{N1}R^{N2}$ is preferable. $R^{N1}$ and $R^{N2}$ each independently represent a hydrogen atom, an alkyl group which may have a substituent, or an aryl group which may have a substituent.

The above-described alkyl group may be linear, branched, or cyclic, and is preferably linear or branched.

The number of carbon atoms in the above-described alkyl group is preferably 1 to 20 and more preferably 1 to 5.

The number of ring members in the above-described aromatic ring which may have a substituent is preferably 6 to 30, more preferably 6 to 18, and still more preferably 6 to 12.

Examples of the above-described aromatic ring which may have a substituent include aromatic hydrocarbon rings such as a benzene ring, a naphthalene ring, an anthracene ring, and a phenanthrene ring, which may have a substituent; and aromatic heterocyclic rings such as an indole ring, a pyrrole ring, a pyrazole ring, a triazole ring, a pyridine ring, a pyrazine ring, a pyrimidine ring, a pyridazine ring, a thiophene ring, a furan ring, a pyran ring, a thiazole ring, an oxazole ring, a selenophene ring, and an imidazole ring, which may have a substituent. Among these, an aromatic hydrocarbon ring which may have a substituent is preferable, and a benzene ring which may have a substituent is more preferable.

$R^{c1}$ represents a hydrogen atom, an alkyl group which may have a substituent, or an aryl group which may have a substituent. $R^{c2}$ represents an alkyl group which may have a substituent or an aryl group which may have a substituent.

Examples of the above-described alkyl group which may have a substituent include the above-described alkyl group represented by $R^{b1}$.

As $R^{c1}$ and $R^{c2}$, a linear or branched alkyl group which does not have a substituent is preferable.

$X^{c1}$ represents —O— or —$NR^{c3}$—. $R^{c3}$ represents a hydrogen atom, an alkyl group which may have a substituent, or an aryl group which may have a substituent.

$X^{c1}$ and $R^{c3}$ are the same as $X^{a1}$ and $R^{a4}$ described above, and suitable ranges thereof are also the same.

It is also preferable that the specific color-forming agent includes at least one selected from the group consisting of a compound represented by Formula (IV) or a ring-closed compound of the compound, and a compound represented by Formula (V).

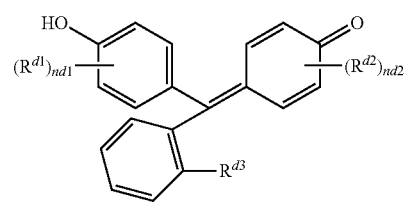

(IV)

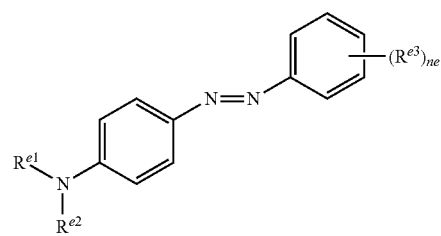

(V)

In Formula (IV), $R^{d1}$ and $R^{d2}$ each independently represent a halogen atom or an alkyl group which may have a substituent. $R^{d3}$ represents $COO^-M_d^+$ or $SO_3^-M_d^+$. $M_d^+$ represents a cation. nd1 and nd2 each independently represent an integer of 0 to 4.

In Formula (V), $R^{e1}$ and $R^{e2}$ each independently represent an alkyl group which may have a substituent. $R_{e3}$ represents $COO^-M_e^+$ or $SO_3^-M_e^+$. $M_e^+$ represents a cation. ne represents 0 or 1.

$R^{d1}$ and $R^{d2}$ each independently represent a halogen atom or an alkyl group which may have a substituent.

The above-described halogen atom is preferably a chlorine atom or a bromine atom.

The above-described alkyl group which may have a substituent may be linear, branched, or cyclic.

The number of carbon atoms in the above-described alkyl group which may have a substituent is usually 1 to 10.

$R^{d3}$ represents $COO^-M_d^+$ or $SO_3^-M_e^+$. $M_e^+$ represents a cation.

Examples of the above-described cation include known cations, and specific examples thereof include a monovalent cation such as $H^+$ (proton), a monovalent organic cation, and a monovalent inorganic cation, and $K^+$ or $Na^+$ is preferable.

$n^{d1}$ and $n^{d2}$ each independently represent an integer of 0 to 4.

$n^{d1}$ and $n^{d2}$ may be the same or different from each other, and preferably represent the same integer.

Hereinafter, the compound represented by Formula (V) will be described in detail.

$R^{e1}$ and $R_{d2}$ each independently represent an alkyl group which may have a substituent.

Examples of $R^{e1}$ and $R_{e2}$ include the alkyl group which may have a substituent, represented by $R^{d1}$ and $R^{d2}$ described above.

$R^{e3}$ represents $COO^-M_e^+$ or $SO_3^-M_e^+$. $M_e^+$ represents a cation.

$M_e^+$ is the same as $M_d^+$, and a suitable aspect thereof is also the same.

ne represents 0 or 1.

Examples of the specific color-forming agent include 3,3-bis(2-methyl-1-octyl-3-indolyl)phthalide, 6'-(dibutylamino)-2'-bromo-3-methylspiro[phthalido-3, 9'-xanthene], 3-(4-diethylamino-2-ethoxyphenyl)-3-(1-ethyl-2-methylindol-3-yl)-4-azaphthalide, 3-(4-diethylamino-2-ethoxyphenyl)-3-(1-n-octyl-2-methylindol-3-yl)phthalide, 3-[2,2-bis(1-ethyl-2-methylindol-3-yl)vinyl]-3-(4-diethylaminophenyl)-phthalide, 2-anilino-6-dibutylamino-3-methylfluorane, 6-diethylamino-3-methyl-2-(2,6-xylidino)-fluorane, 2-(2-chloroanilino)-6-dibutylaminofluorane, 2-anilino-6-diethylamino-3-methylfluorane, 9-[ethyl(3-methylbutyl)amino]spiro[12H-benzo[a]xanthene-12,1' (3'H)isobenzofuran]-3'-one, 2'-methyl-6'-(N-p-tolyl-N-ethylamino)spiro[isobenzofuran-1(3H),9'-[9H]xanthene]-3-one, 3',6'-bis(diethylamino)-2-(4-nitrophenyl)spiro[isoindole-1,9'-xanthene]-3-one, 9-(N-ethyl-N-isopentylamino)spiro[benzo[a]xanthene-12,3'-phthalide], 2'-anilino-6'-(N-ethyl-N-isopentylamino)-3-methyl spiro[phthalide-3,9'-[9H]xanthene], and 6'-(diethylamino)-1',3'-dimethylfluorane.

Examples of the above-described compound represented by Formula (IV) include a ring-opened body of a compound having a sultone ring (ring-opened compound of a sultone ring), such as phenol red, thymol blue, bromothymol blue, bromocresol green, and bromocresol purple; and a ring-opened body of a compound having a lactone ring (ring-opened compound of a lactone ring), such as phenolphthalein and thymolphthalein.

Examples of the above-described compound represented by Formula (V) include a compound having an azobenzene structure, such as methyl yellow, methyl orange, and methyl red.

Examples of the specific color-forming agent also include U.S. Pat. No. 3,445,234A, JP1993-257272A (JP-H5-257272A), and paragraphs 0029 to 0034 of WO2009/008248A.

The maximal absorption wavelength of the specific color-forming agent is usually in a wavelength range of 190 to 400 nm, preferably in a wavelength range of 200 to 300 nm and more preferably in a wavelength range of 200 to 230 nm.

The molecular weight of the specific color-forming agent is preferably 300 or more and more preferably 500 or more. The upper limit thereof is preferably 2,000 or less and more preferably 1,000 or less.

A tint in a case where the specific color-forming agent forms color is not particularly limited, but from the viewpoint of visibility, it is preferable that the specific color-forming agent forms a reddish color (for example, red, magenta, orange, or the like). Specifically, in L*a*b* standardized in CIE color system, a* is preferably more than 0. The L*a*b* can be measured using a spectrophotometer Spectrolino (manufactured by GretagMacbeth AG) in accordance with JIS Z 8781-4:2013.

The specific color-forming agent may be used alone or in combination of two or more kinds thereof.

A content of the specific color-forming agent per unit area of the ultraviolet-sensing layer is preferably 0.010 to 1.000 $g/m^2$, more preferably 0.020 to 0.600 $g/m^2$, and still more preferably 0.020 to 0.140 $g/m^2$.

By setting the content of the specific color-forming agent within the above-described range, since excessive absorption of light having a wavelength of 222 nm by the specific color-forming agent is suppressed, it is presumed that the color formability with respect to the light having a wavelength of 222 nm is excellent even with a low irradiation amount.

The content of the specific color-forming agent can be measured by the following method.

The above-described content can be calculated by cutting out the ultraviolet-sensing layer from the ultraviolet inspection tool, immersing the ultraviolet-sensing layer in methanol for 2 days, and then analyzing the obtained methanol by liquid chromatography. The methanol is prevented from volatilizing while the ultraviolet-sensing layer is immersed. A calibration curve of the content of the specific color-forming agent to be detected is created under the same measurement conditions as the measurement of the liquid chromatography. Measurement conditions of the liquid chromatography are as follows.

Equipment: Nexera (manufactured by Shimadzu Corporation)
Column: Capcell pak C18 UG-120
Eluent: water/methanol
Oven: 40° C.
Injection: 5 μL
Detection: maximal absorption wavelength of specific color-forming agent to be detected
Flow Rate: 0.2 mL/min <Specific Acid Generator>

The ultraviolet-sensing layer contains the specific acid generator.

The specific acid generator is an acid generator having a molecular weight of 600 or less.

The molecular weight of the specific acid generator is 600, preferably 200 to 600 and more preferably 300 to 500. From the viewpoint that the number of moles of the generated acid per unit mass of the specific acid generator, it is preferable that the molecular weight of the specific acid generator is smaller. On the other hand, from the viewpoint of storage stability, the molecular weight of the specific acid generator is preferably 200 or more.

The "acid generator" means a compound capable of generating an acid.

The specific acid generator is preferably a compound which is activated by light to generate an acid. For example, it is preferable that the acid generated from the specific acid generator activated by light acts on the specific color-forming agent to cause the specific color-forming agent to form color, and it is more preferable that the acid generated from the specific acid generator activated by ultraviolet rays (particularly, light having a wavelength of 222 nm) acts on the specific color-forming agent to cause the specific color-forming agent to form color.

The acid generated from the specific acid generator may be an organic acid such as a carboxylic acid or an inorganic acid, and an inorganic acid is preferable.

Examples of the above-described inorganic acid include hydrogen halide, sulfonic acid, sulfuric acid, and nitric acid.

From the viewpoint that the effect of the present invention is more excellent, it is preferable that the specific acid generator includes a compound which generates at least one acid selected from the group consisting of HBr, HI, $HPF_6$, $HSbF_6$, and perfluorosulfonic acid, it is more preferable to include a compound which generates at least one acid selected from the group consisting of HBr and HI, and it is still more preferable to include a compound generating HBr. Since the above-described acids are a strong acid, it is considered that the effect of the present invention is more excellent.

Examples of the specific acid generator include a non-ionic acid generator and an ionic acid generator.

The specific acid generator preferably includes at least one selected from the group consisting of an organic halogen compound, a sulfonium salt compound, and an iodonium salt compound, more preferably includes at least one selected from the group consisting of a compound represented by Formula (1) described later and a triarylsulfonium salt compound, and still more preferably includes a compound represented by Formula (1).

Since the compound represented by Formula (1) and the triarylsulfonium salt compound absorb less light having a wavelength of 300 nm or more, they are less likely to form color with respect to a fluorescent lamp or the like. For example, in a case where the amount of ultraviolet irradiation is measured using the ultraviolet inspection tool, it is often measured under a fluorescent lamp or the like. In such a case, in a case where the acid generator is reacted at a wavelength range of the fluorescent lamp or the like to form color, there is a possibility that the target light having a wavelength of 222 nm cannot be accurately measured.

Therefore, in a case where the specific acid generator is the above-described compound, color forming with light having a wavelength of 300 nm or more can be suppressed even in a case where the content of the specific acid generator is increased, and the color forming with the target light having a wavelength of 222 nm is improved.

(Non-Ionic Acid Generator)

Examples of the non-ionic acid generator include an organic halogen compound, an oxime compound, and a diazo compound.

From the viewpoint that the effect of the present invention is more excellent, the organic halogen compound is preferably a compound in which the number of halogen atoms in the molecule is 3 or more. The upper limit of the number of halogen atoms described above is preferably 9 or less, and more preferably 5 or less.

As the organic halogen compound, a compound represented by Formula (1) or a compound represented by Formula (2) is preferable, and a compound represented by Formula (1) is more preferable.

$$R^1\text{-}L^1\text{-}CX^1X^2X^3 \qquad (1)$$

In Formula (1), $R^1$ represents an aryl group which may have a substituent or a heteroaryl group which may have a substituent. $L^1$ represents —SO— or —$SO_2$—. $X^1$ to $X^3$ each independently represent a hydrogen atom or a halogen atom. However, all of $X^1$ to $X^3$ are not hydrogen atoms at the same time.

$R^1$ represents an aryl group which may have a substituent or a heteroaryl group which may have a substituent.

The number of carbon atoms in the above-described aryl group which may have a substituent is preferably 6 to 20, more preferably 6 to 14, and still more preferably 6 to 10.

The number of carbon atoms in the above-described heteroaryl group which may have a substituent is preferably 4 to 20, more preferably 4 to 13, and still more preferably 4 to 9.

Examples of the substituent which may be included in the above-described aryl group which may have a substituent and the above-described heteroaryl group which may have a substituent include a nitro group, a halogen atom, an alkyl group having 1 to 3 carbon atoms, a haloalkyl group having 1 to 3 carbon atoms, an acetyl group, a haloacetyl group, and an alkoxy group having 1 to 3 carbon atoms.

$L^1$ represents —SO— or —$SO_2$—.

$L^1$ is preferably —$SO_2$—.

$X^1$ to $X^3$ each independently represent a hydrogen atom or a halogen atom. However, all of $X^1$ to $X^3$ are not hydrogen atoms at the same time.

Examples of $X^1$ to $X^3$ include a fluorine atom, a chlorine atom, a bromine atom, and an iodine atom, and a chlorine atom, a bromine atom, or an iodine atom is preferable and a chlorine atom or a bromine atom is more preferable.

Examples of the compound represented by Formula (1) include hexabromodimethyl sulfoxide, pentabromodimethyl sulfoxide, hexabromodimethylsulfone, trichloromethylphenylsulfone, tribromomethylphenylsulfone (BMPS), trichloro-p-chlorophenylsulfone, tribromomethyl-p-nitrophenylsulfone, 2-trichloromethylbenzothiazolesulfone, 4,6-dimethylpyrimidine-2-tribromomethylsulfone, tetrabromodimethylsulfone, 2,4-dichlorophenyl-trichloromethylsulfone, 2-methyl-4-chlorophenyltrichloromethylsulfone, 2,5-dimethyl-4-chlorophenyltrichloromethylsulfone, 2,4-dichlorophenyltrimethylsulfone, and tri-p-tolylsulfonium trifluoromethanesulfonate. Among these, trichloromethylphenylsulfone or tribromomethylphenylsulfone (BMPS) is preferable, and tribromomethylphenylsulfone (BMPS) is more preferable.

$$R^4CX^6X^7X^8 \qquad (2)$$

In Formula (2), $R^4$ represents a heteroaryl group which may have a substituent. $X^6$ to $X^8$ each independently represent a hydrogen atom or a halogen atom. However, all of $X^6$ to $X^8$ are not hydrogen atoms at the same time.

As the heteroaryl group represented by $R^4$, a heteroaryl group having 4 to 20 carbon atoms is preferable, a heteroaryl group having 4 to 13 carbon atoms is more preferable, and a heteroaryl group having 4 to 9 carbon atoms is still more preferable. Among these, a triazine group is preferable.

Examples of the substituent which can be included in the heteroaryl group represented by $R^4$ include a nitro group, a halogen atom, an alkyl group having 1 to 3 carbon atoms, a haloalkyl group having 1 to 3 carbon atoms, an acetyl group, a haloacetyl group, and an alkoxy group having 1 to 3 carbon atoms.

Examples of the halogen atom represented by $X^6$ to $X^8$ include a fluorine atom, a chlorine atom, a bromine atom, and an iodine atom, and a chlorine atom, a bromine atom, or an iodine atom is preferable and a chlorine atom or a bromine atom is more preferable.

Examples of the compound represented by Formula (2) include 2,4,6-tris(trichloromethyl)-1,3,5-triazine and 2-methyl-4,6-bis(trichloromethyl)-1,3,5-triazine.

Examples of the oxime compound include (2-methyl-2-[(4-methylphenyl)sulfonyl]-1-[4-(methylthio)phenyl]-1-propanone).

Examples of the diazo compound include bis(t-butylsulfonyl)diazomethane, bis(cyclohexylsulfonyl)diazomethane, and bis(4-methylphenylsulfonyl)diazomethane.

(Ionic Acid Generator)

Examples of the ionic acid generator include a diazonium salt compound, an iodonium salt compound, and a sulfonium salt compound, and a sulfonium salt compound or an iodonium salt compound is preferable, a sulfonium salt compound is more preferable, and a triarylsulfonium salt compound is still more preferable.

Examples of an aryl group included in the above-described triarylsulfonium salt compound include an aryl group which may have a substituent, and from the viewpoint that the effect of the present invention is more excellent, an aryl group having no substituent (unsubstituted aryl group) is preferable.

Examples of the ionic acid generator include compounds described in JP1987-161860A (JP-S62-161860A), JP1986-067034A (JP-S61-067034A), and JP1987-050382A (JP-S62-050382A), the contents of which are incorporated in the present specification.

Examples of the ionic acid generator include triarylsulfonium salt compounds such as triarylsulfonium hexafluorophosphate (for example, triphenylsulfonium hexafluorophosphate, tritolylsulfonium hexafluorophosphate, diphenyltolylsulfonium hexafluorophosphate, and the like), triarylsulfonium arsenate (for example, triphenylsulfonium acetate and the like), and triarylsulfonium antimonate (for example, triphenylsulfonium antimonate and the like).

In addition, examples of the sulfonium salt compound other than the triarylsulfonium salt compound include dialkylphenacylsulfonium tetrafluoroborate, dialkylphenacylsulfonium hexafluorophosphate, dialkyl-4-hydroxyphenylsulfonium tetrafluoroborate, and dialkyl-4-hydroxyphenylsulfonium hexafluorophosphate.

In addition, examples of the iodonium salt compound include diaryliodonium hexafluorophosphate, diaryliodonium arsenate, and diaryliodonium antimonate.

The specific acid generator may be used alone or in combination of two or more kinds thereof.

A content of the specific acid generator per unit area of the ultraviolet-sensing layer is preferably 0.03 to 3 g/m², more preferably 0.05 to 1.5 g/m², and still more preferably 0.1 to 1 g/m².

The above-described content of the specific acid generator can be measured using liquid chromatography by extracting the specific acid generator in methanol in the same manner as in the method for measuring the above-described content of the specific color-forming agent. The above-described specific acid generator is detected at the maximal absorption wavelength of the above-described specific acid generator to be detected.

<Mass Ratio>

The mass ratio of the content of the specific acid generator to the content of the specific color-forming agent (content of specific acid generator/content of specific color-forming agent) is 1.01 to 40.00, and from the viewpoint that the effect of the present invention is more excellent, it is preferably 2.01 to 40.00 and more preferably 3.00 to 35.00.

In addition, examples of a suitable aspect of the ultraviolet inspection tool include an aspect in which the specific color-forming agent includes at least one selected from the group consisting of a compound represented by Formula (I), a compound represented by Formula (III), and a ring-opened compound of these compounds, and the mass ratio of the content of the specific acid generator to the content of the specific color-forming agent is 2.01 to 40.00.

In a case where the above-described mass ratio is within the above-described range, since the absorption of the specific color-forming agent with light having a wavelength of 222 nm is suppressed and the specific acid generator can efficiently absorb the light having a wavelength of 222 nm, it is presumed that the effect of the present invention is more excellent.

The mass ratio of the above-described content of the specific acid generator to the above-described content of the specific color-forming agent can be measured using liquid chromatography by extracting the specific acid generator in methanol in the same manner as in the method for measuring the above-described content of the specific color-forming agent. The above-described specific acid generator is detected at the maximal absorption wavelength of the above-described specific acid generator to be detected, the above-described specific color-forming agent is detected at the maximal absorption wavelength of the above-described specific color-forming agent to be detected, and the mass ratio thereof is obtained.

<Light Stabilizer>

The ultraviolet-sensing layer may contain a light stabilizer.

The light stabilizer may be any material which stabilizes with light, but it is preferably a light stabilizer which acts as a so-called free-radical scavenger, trapping free radicals of the activated specific acid generator.

Examples of the light stabilizer include polyhydric phenols such as 2,5-bis(1,1,3,3-tetramethylbutyl)hydroquinone, hydroquinone, catechol, resorcinol, and hydroxyhydroquinone; aminophenols such as o-aminophenol and p-aminephenol.

The light stabilizer may be used alone or in combination of two or more kinds thereof.

A molar ratio of a content of the light stabilizer to the content of the specific acid generator (content of light stabilizer/content of specific acid generator (molar ratio)) is preferably 0.0001 to 10 and more preferably 0.0002 to 5.

<Ultraviolet Absorber>

The ultraviolet-sensing layer may contain an ultraviolet absorber.

The ultraviolet absorber may be used alone or in combination of two or more kinds thereof.

Examples of the ultraviolet absorber include a benzotriazole compound having a benzotriazole structure, a benzophenone compound, a triazine compound, and a benzodithiol compound.

From the viewpoint that sensitivity to light having a wavelength of 222 nm is more excellent, it is preferable that the ultraviolet absorber has a small absorption of the light having a wavelength of 222 nm. As the ultraviolet absorber, a triazine compound, a benzophenone compound, or a benzodithiol compound is preferable.

In addition, it is preferable that the ultraviolet-sensing layer does not contain a benzotriazole compound having a large absorption of the light having a wavelength of 222 nm. In a case where the ultraviolet-sensing layer contains a benzotriazole compound, a content of the benzotriazole compound is preferably 1% by mass or less, and more preferably 0.5% by mass or less with respect to the total mass of the specific acid generator. The lower limit is often 0.0001% by mass or more. In addition, the content of the benzotriazole compound is preferably 1% by mass or less, and more preferably 0.5% by mass or less, with respect to the total mass of the specific color-forming agent. The lower limit is often 0.0001% by mass or more.

Examples of the triazine compound include ADK STAB LA-F70 (manufactured by ADEKA Corporation); Tinuvin 1577 ED and Tinuvin 1600 (manufactured by BASF); 2,4-B is (2,4-dimethylphenyl)-6-(2-hydroxy-4-n-octyloxyphenyl)-1,3,5-triazine, 2-(2,4-Dihydroxyphenyl)-4,6-diphenyl-1,3,5-triazine, and Ethylhexyl Triazone (manufactured by TOKYO CHEMICAL INDUSTRY CO., LTD.).

Examples of the benzophenone compound include Chimassorb 81 and Chimassorb 81 FL (manufactured by BASF).

Examples of the benzodithiol compound include compounds described in WO2019/159570A.

<Binder>

The ultraviolet-sensing layer may contain a binder.

It is preferable that the above-described binder includes either a water-soluble binder resin or a water-insoluble binder resin.

Examples of the binder include cellulose resins such as methylcellulose, ethylcellulose, carboxymethylcellulose, and hydroxypropylcellulose, gum arabic, gelatin, polyvinylpyrrolidone, casein, styrene-butadiene copolymer, acrylonitrile-butadiene copolymer, polyvinyl acetate, acrylic resin, polyvinyl chloride, and ethylene-vinyl acetate copolymer. From the viewpoint that the effect of the present invention is more excellent, the binder is preferably a binder having substantially no aromatic group, and more preferably a cellulose resin or an acrylic resin.

From the viewpoint that the effect of the present invention is more excellent, the binder is preferably a resin having a hydroxyl group. Examples of the resin having a hydroxyl group include the above-described cellulose resin, polyvinyl alcohol, and polyvinyl butyral.

From the viewpoint that it does not form color without irradiation and has excellent storage stability, it is preferable that the binder has a low acid value. Specifically, it is preferably 0 to 50 mgKOH/g, and more preferably 0 to 20 mgKOH/g. In addition, examples of the binder include binders described in paragraph 0078 of JP2017-167155A, the contents of which are incorporated in the present specification.

The binder may be used alone or in combination of two or more kinds thereof.

The binder may be crosslinked. In other words, the binder may be a crosslinked binder.

A crosslinking agent is not particularly limited, and for example, glyoxazole can be used. In addition, a crosslinking agent described in paragraph 0079 of JP2017-167155A can also be referred to. The contents thereof are incorporated in the present specification.

It is preferable that the binder has substantially no aromatic ring because excessive absorption of light having a wavelength of 222 nm is suppressed. The "substantially no aromatic ring" means that a content of the aromatic ring is preferably 0% to 1% by mass and more preferably 0% to 0.1% by mass with respect to the total mass of the binder.

<Surfactant>

The ultraviolet-sensing layer may contain a surfactant.

The surfactant is preferably an anionic or non-ionic surfactant, and examples thereof include alkylbenzenesulfonates (such as sodium dodecylbenzenesulfonate and ammonium dodecylbenzenesulfonate), alkylsulfonates (such as sodium lauryl sulfate and dioctyl sodium sulfosuccinate), polyalkylene glycols (such as polyoxyethylene nonylphenyl ether).

<Other Components>

The ultraviolet-sensing layer may contain, as necessary, at least one additive selected from the group consisting a colorant, a wax, a color-forming agent other than the specific color-forming agent, an acid generator other than the specific acid generator, and an odor suppressant, in addition to the above-described components.

The color of the colorant can be controlled by using the colorant in combination with the color-forming agent.

Examples of the colorant include a dye and a pigment. Examples of the pigment include yellow pigments described in paragraphs 0018 to 0022 of WO2016/017701A and inorganic particles such as a white pigment.

<Method for Forming Ultraviolet-Sensing Layer>

Examples of a method for forming the ultraviolet-sensing layer include known methods.

Examples thereof include a method of applying a composition for forming an ultraviolet-sensing layer onto a support, and as necessary, drying the coating film.

The composition for forming an ultraviolet-sensing layer may contain the specific color-forming agent, the specific acid generator, and other components described above as necessary.

Examples of the method of applying the composition for forming an ultraviolet-sensing layer include, as a coating machine used for the applying, an air knife coater, a rod coater, a bar coater, a curtain coater, a gravure coater, an extrusion coater, a die coater, a slide bead coater, and a blade coater.

After the composition for forming an ultraviolet-sensing layer is applied onto the support, the coating film may be subjected to a drying treatment, as necessary. Examples of the drying treatment include a blower treatment and a heating treatment.

Although the method for forming the ultraviolet-sensing layer on the support has been described, the present invention is not limited to the above-described aspect. For example, after forming the ultraviolet-sensing layer on a temporary support, the temporary support may be peeled off to form the ultraviolet inspection tool including the ultraviolet-sensing layer.

The temporary support is not particularly limited as long as it is a peelable support.

[Support]

The ultraviolet inspection tool may include a support.

The support is a member for supporting the ultraviolet-sensing layer.

In a case where the ultraviolet-sensing layer itself can be handled, the ultraviolet inspection tool may not include the support.

Examples of the support include a resin sheet, paper (including synthetic paper), cloth (including woven fabric and nonwoven fabric), glass, wood, and metal. As the support, a resin sheet or paper is preferable, a resin sheet or synthetic paper is more preferable, and a resin sheet is still more preferable.

Examples of a material of the resin sheet include a polyethylene resin, a polypropylene resin, a cyclic polyolefin resin, a polystyrene resin, an acrylonitrile-styrene copolymer, an acrylonitrile-butadiene-styrene copolymer, a polyvinyl chloride resin, a fluororesin, a poly(meth)acrylic resin, a polycarbonate resin, a polyester resin (for example, polyethylene terephthalate, polyethylene naphthalate, and the like), a polyamide resin such as nylon, a polyimide resin, a polyamide-imide resin, a polyaryl phthalate resin, a silicone resin, a polysulfone resin, a polyphenylene sulfide resin, a polyethersulfone resin, a polyurethane resin, an acetal-based resin, and a cellulose-based resin.

Examples of the synthetic paper include paper in which many microvoids are formed by biaxially stretching polypropylene or polyethylene terephthalate (for example, YUPO and the like); paper produced from synthetic fibers such as polyethylene, polypropylene, polyethylene terephthalate, and polyamide; and paper in which these papers are laminated on part, one side, or both sides thereof.

In addition, examples of another suitable aspect of the resin sheet include a white resin sheet formed by dispersing a white pigment in a resin. Examples of a material of the resin in the above-described white resin sheet include the same materials as those in the resin sheet described above.

The white resin sheet has ultraviolet reflectivity. Therefore, in a case where the support is the white resin sheet, since ultraviolet rays irradiated to the ultraviolet inspection tool are reflected by the support, it is possible to suppress scattering of the ultraviolet rays inside the ultraviolet inspection tool. As a result, accuracy of detecting the amount of ultraviolet irradiation in the ultraviolet inspection tool can be further improved.

Examples of the white pigment include white pigments described in paragraph 0080 of WO2016/017701A, the contents of which are incorporated in the present specification.

As the white resin sheet, a white polyester sheet is preferable, and a white polyethylene terephthalate sheet is more preferable.

Examples of a commercially available product of the white resin sheet include YUPO (manufactured by YUPO Corporation), LUMIRROR (manufactured by Toray Industries Inc.), and CRISPER (manufactured by Toyobo Co., Ltd.).

A thickness of the support is preferably 5 µm or more, more preferably 25 µm or more, and still more preferably 50 µm or more. The upper limit is preferably 1 cm or less, more preferably 2 mm or less, and still more preferably 500 µm or less.

[Other Layers]

The ultraviolet inspection tool may include other layers in addition to the above-described ultraviolet-sensing layer and the above-described support.

Examples of the other layers include a reflective layer, a glossy layer, a filter layer, and a sensitivity-adjusting layer.

<Reflective Layer>

The ultraviolet inspection tool may further include a reflective layer.

In a case where the ultraviolet-sensing layer include a reflective layer, since ultraviolet rays irradiated to the ultraviolet inspection tool can be reflected by the layer having ultraviolet reflectivity, scattering of the ultraviolet rays inside the ultraviolet inspection tool can be suppressed, and detection accuracy of the amount of ultraviolet irradiation can be further improved.

A reflectivity of the reflective layer with respect to light having a wavelength of 180 to 380 nm is preferably 10% to 100%, and more preferably 50% to 100%. The reflectivity can be measured, for example, by diffusion reflection measurement using an ultraviolet-visible spectrophotometer (UV-2700, manufactured by Shimadzu Corporation).

In a case where the support is disposed adjacent to the reflective layer, an adhesive layer may be provided between the support and the reflective layer.

Examples of the reflective layer, the adhesive layer, and manufacturing methods thereof include the reflective layer, the adhesive layer, and manufacturing methods thereof, which are described in paragraphs 0082 to 0091 of WO2016/017701A, the contents of which are incorporated in the present specification.

<Glossy Layer>

The ultraviolet inspection tool may further include a glossy layer.

In a case where the ultraviolet-sensing layer has a glossy layer, visibility of front and back surfaces can be improved.

Examples of the glossy layer and a method for producing the glossy layer include glossy layers and method for producing the glossy layer, described in paragraphs 0092 to 0094 of WO2016/017701A, the contents of which are incorporated in the present specification.

<Filter Layer>

It is preferable that the ultraviolet inspection tool further includes a filter layer.

The filter layer is a layer which selectively transmits light having an arbitrary wavelength (hereinafter, also referred to as "predetermined wavelength"). The "selectively transmits light having a predetermined wavelength" means transmitting the light having a predetermined wavelength and shielding other lights. The predetermined wavelength can be appropriately adjusted according to the intended use of the ultraviolet inspection tool. A transmittance of light having a wavelength to be transmitted is preferably 70% to 100%, more preferably 80% to 100%, and still more preferably 90% to 100%. A transmittance of light having a wavelength to be shielded is preferably 0% to 30%, more preferably 0% to 20%, and still more preferably 0% to 10%.

The filter layer is preferably a filter layer which shields light having a wavelength of 300 nm or more, and more preferably a filter layer which shields light having a wavelength of 300 to 800 nm. An ultraviolet band pass filter and/or a filter containing a dielectric is preferable.

Spectral characteristics of the filter layer and the sensitivity-adjusting layer described later can be measured using, for example, an ultraviolet-visible spectrophotometer (UV-2700, manufactured by Shimadzu Corporation).

The filter layer preferably contains an ultraviolet absorber. As the ultraviolet absorber, a known ultraviolet absorber can be used.

Examples of the filter layer and a method for producing the glossy layer include filter layers and method for producing the glossy layer, described in paragraphs 0016 to 0026 of WO2016/017701A, the contents of which are incorporated in the present specification.

<Sensitivity-Adjusting Layer>

In a case where the ultraviolet inspection tool has the filter layer, a sensitivity-adjusting layer may be further provided on a surface of the filter layer.

Examples of the sensitivity-adjusting layer and a method for producing the glossy layer include sensitivity-adjusting layers and method for producing the glossy layer, described in paragraphs 0095 to 0109 of WO2016/017701A, the contents of which are incorporated in the present specification.

Second Embodiment

The second embodiment of the ultraviolet inspection tool is an embodiment in which the microcapsule described later is contained.

Specifically, in the second embodiment of the ultraviolet inspection tool, the ultraviolet-sensing layer contains a microcapsule, the microcapsule contains the specific color-forming agent and the specific acid generator, and a mass ratio of a content of the specific acid generator to a content of the specific color-forming agent is 1.01 to 40.00.

The second embodiment of the ultraviolet inspection tool 10 is the same as the first embodiment of the ultraviolet inspection tool 10 described above, except that the microcapsule (not shown) is contained in the ultraviolet-sensing layer 14, and the microcapsule contains the specific color-forming agent and the specific acid generator.

Hereinafter, each member included in the second embodiment of the ultraviolet inspection tool will be described in detail.

[Ultraviolet-Sensing Layer]

The ultraviolet inspection tool has an ultraviolet-sensing layer.

The ultraviolet-sensing layer contains a microcapsule containing the specific color-forming agent and the specific acid generator.

<Microcapsule>

The ultraviolet-sensing layer contains a microcapsule.

Hereinafter, materials constituting the microcapsule will be described in detail.

The microcapsule usually includes a core portion and a capsule wall for encompassing a core material (encompassed substance (hereinafter, also referred to as an encompassed component)) forming the core portion.

The microcapsule contains, as the core material (encompassed component), the specific acid generator and the specific color-forming agent.

It is preferable that the microcapsule prevents contact between substances inside and outside the capsule by a substance-separating action of the capsule wall at normal temperature. Specific examples thereof include JP1984-190886A (JP-S59-190886A) and JP1985-242094A (JP-S60-242094A), the contents of which are incorporated in the present specification.

(Capsule Wall)

It is preferable that the capsule wall of the microcapsule is substantially composed of a resin.

The term "substantially composed of a resin" means that a content of the resin with respect to the total mass of the capsule wall is 90% by mass or more, preferably 100% by mass. That is, it is preferable that the capsule wall of the microcapsule is composed of a resin.

Examples of the above-described resin include polyurethane, polyurea, polyurethane urea, polyester, polycarbonate, a urea-formaldehyde resin, a melamine-formaldehyde resin, polystyrene, a styrene-methacrylate copolymer, gelatin, polyvinylpyrrolidone, and polyvinyl alcohol. Among these, from the viewpoint that the color formability with respect to light having a wavelength of 222 nm can be further improved by forming a dense crosslinking structure which prevents encompassed substances from leaking and by controlling the transmittance at the wavelength of 222 nm, at least one selected from the group consisting of polyurea, polyurethane urea, and polyurethane are more preferable.

The polyurea is a polymer having a plurality of urea bonds, and is preferably a reaction product formed from a raw material containing polyamine and polyisocyanate.

It is also possible to synthesize the polyurea using the polyisocyanate without using the polyamine, by utilizing the fact that a part of the polyisocyanate reacts with water to form the polyamine.

In addition, the polyurethane urea is a polymer having a urethane bond and a urea bond, and is preferably a reaction product formed from a raw material containing polyol, polyamine, and polyisocyanate.

In a case where the polyol is reacted with the polyisocyanate, a part of the polyisocyanate reacts with water to form the polyamine, and as a result, the polyurethane urea is obtained.

In addition, the polyurethane is a polymer having a plurality of urethane bonds, and is preferably a reaction product formed from a raw material containing polyol and polyisocyanate. The polyisocyanate preferably has an aromatic ring or an alicyclic ring.

Among these, the polyisocyanate more preferably has an alicyclic ring. In a case of using the polyisocyanate having an alicyclic ring, the transparency of the microcapsule wall is excellent, so that the sensitivity to light having a wavelength of 222 nm is more excellent.

Examples of the aromatic polyisocyanate include an aromatic diisocyanate, and specific examples thereof include m-phenylene diisocyanate, p-phenylene diisocyanate, 2,6-tolylene diisocyanate, 2,4-tolylene diisocyanate, naphthalene-1,4-diisocyanate, diphenylmethane-4,4'-diisocyanate, 3,3'-dimethoxy-biphenyl diisocyanate, 3,3'-dimethyldiphenylmethane-4,4'-diisocyanate, xylylene-1,4-diisocyanate, xylylene-1,3-diisocyanate, 4-chloroxylylene-1,3-diisocyanate, 2-methylxylylene-1,3-diisocyanate, 4,4'-diphenylpropane diisocyanate, and 4,4'-diphenylhexafluoropropane diisocyanate.

Examples of the aliphatic polyisocyanate include an aliphatic diisocyanate, and specific examples thereof include trimethylene diisocyanate, hexamethylene diisocyanate, prop ylene-1,2-diisocyanate, butylene-1,2-diisocyanate, cyclohexylene-1,2-diisocyanate, cyclohexylene-1,3-diisocyanate, cyclohexylene-1,4-diisocyanate, dicyclohexylmethane-4,4'-diisocyanate, 1,4-bis(isocyanatomethyl)cyclohexane, 1,3-bis(isocyanatomethyl)cyclohexane, isophorone diisocyanate, lysine diisocyanate, hydrogenated tolylene diisocyanate, and hydrogenated xylylene diisocyanate.

Examples of the polyisocyanate also include a tri- or higher functional polyisocyanate (for example, triisocyanate having three functionality, tetraisocyanate having four functionality, and the like).

As the tri- or higher functional polyisocyanate, a tri- or higher functional polyisocyanate which is an adduct of an aromatic or alicyclic diisocyanate and a compound having 3 or more active hydrogen groups in one molecule (for example, tri- or higher functional polyol, polyamine, polythiol, or the like) (tri- or higher functional polyisocyanate which is an adduct type), or an aromatic or alicyclic diisocyanate trimer (biuret type or isocyanurate type) is preferable.

Examples of the polyisocyanate also include formalin condensates of benzene isocyanate, polyisocyanates having a polymerizable group, such as methacryloyloxyethyl isocyanate, and lysine triisocyanates.

For the polyisocyanate, the "Polyurethane Resin Handbook" (edited by Keiji Iwata, published by Nikkan Kogyo Shimbun (1987)) can be referred to.

Examples of the polyol include aliphatic and aromatic polyhydric alcohols, hydroxypolyester, and hydroxypolyalkylene ether.

Specific examples thereof include polyols described in JP1985-049991A (JP-S60-049991A), and examples thereof include dihydroxycyclohexane, diethylene glycol, 1,2,6-trihydroxyhexane, 2-phenylpropylene glycol, 1,1,1-trimethylolpropane, hexanetriol, and pentaerythritol.

A content of the hydroxyl group in the polyol is preferably 0.02 to 2 mol with respect to 1 mol of the isocyanate group.

Examples of the polyamine include ethylenediamine, trimethylenediamine, tetramethylenediamine, pentamethylenediamine, hexamethylenediamine, tetraethylenepentamine, and amine adduct of an epoxy compound.

The polyisocyanate can also react with water to form a polymer substance.

Examples of the polyisocyanate, the polyol, and the polyamine include in U53281383A, U.S. Pat. No. 3,773,695A, U53793268A, JP1973-040347B (JP-548-040347B), JP1974-024159B (JP-549-024159B), JP1973-080191A (JP-548-080191A), and JP1973-084086B (JP-548-084086B), the contents of which are incorporated in the present specification.

An average particle diameter of the microcapsule is preferably 0.1 to 100 µm in terms of volume average particle size.

(Solvent)

From the viewpoint of dissolving the specific color-forming agent and the specific acid generator and viewpoint that the effect of the present invention is more excellent, the microcapsule preferably contains a solvent, and more preferably contains a solvent having a boiling point of 100° C. or higher.

Examples of the solvent include known organic solvents, and an aromatic solvent is preferable and aromatic phosphate is more preferable.

—Aromatic Solvent—

The aromatic solvent is an aromatic solvent having an aromatic ring.

The aromatic solvent may have a heteroatom.

Examples of the heteroatom in the aromatic solvent having a heteroatom include an atom other than a carbon atom and a hydrogen atom, and a nitrogen atom, an oxygen atom, a sulfur atom, or a phosphorus atom is preferable, and an oxygen atom or a phosphorus atom is more preferable. From the viewpoint that, while ensuring light transmittance at the wavelength of 222 nm, it promotes the color-forming reaction and has excellent sensitivity with light having a wavelength of 222 nm, the aromatic solvent having a heteroatom preferably includes at least one selected from the group consisting of a carboxylate linking group, a sulfonate linking group, a phosphate linking group, a carbonyl linking group, and a sulfone linking group.

Specific examples of the aromatic solvent having a heteroatom include substituted or unsubstituted benzenesulfonate esters such as methyl benzenesulfonate, ethyl benzenesulfonate, methyl toluenesulfonate, and ethyl toluenesulfonate; substituted or unsubstituted phthalate diesters such as dimethyl phthalate, diethyl phthalate, dibutyl phthalate, dipentyl phthalate, dihexyl phthalate, and dicyclohexyl phthalate; and aromatic phosphates such as triphenyl phosphate (TPP), tricresyl phosphate (TCP), trixylenyl phosphate (TXP), cresyl diphenyl phosphate (CDP), 2-ethylhexyldiphenyl phosphate (EHDP), t-butylphenyl diphenyl phosphate (t-BDP), bis-(t-butylphenyl)phenyl phosphate (BBDP), tris-(t-butylphenyl)phosphate (TBDP), isopropylphenyl diphenyl phosphate (IPP), bis-(isopropylphenyl)diphenyl phosphate (BIPP), and tris-(isopropylphenyl)phosphate (TIPP).

Examples of the aromatic solvent having no heteroatom include diarylalkanes such as alkylbenzene, 1,1-diphenylethane, and 1-phenyl-1-(2,3-xylyl)ethane; alkylbiphenyls such as isopropylbiphenyl; and aromatic hydrocarbons such as triarylmethane, diarylalkylene, and arylindane.

A boiling point of the solvent is preferably 100° C. to 500° C., more preferably 120° C. to 500° C., and still more preferably 140° C. to 500° C.

The solvent may be used alone or in combination of two or more kinds thereof.

(Specific Color-Forming Agent)

The microcapsule contains the specific color-forming agent.

Examples of the specific color-forming agent contained in the microcapsule include the same type of the specific color-forming agent contained in the ultraviolet-sensing layer of the first embodiment described above, and a suitable aspect thereof is also the same.

(Specific Acid Generator)

The microcapsule contains the specific acid generator.

Examples of the specific acid generator contained in the microcapsule include the same type of the specific acid generator contained in the ultraviolet-sensing layer of the first embodiment described above, and a suitable aspect thereof is also the same.

(Mass Ratio)

The mass ratio of the content of the specific acid generator to the content of the specific color-forming agent (content of specific acid generator/content of specific color-forming agent) is 1.01 to 40.00, and from the viewpoint that the effect of the present invention is more excellent, it is preferably 2.01 to 40.00 and more preferably 3.00 to 35.00.

The mass ratio of the above-described content of the specific acid generator to the above-described content of the specific color-forming agent can be measured using liquid chromatography by extracting the specific acid generator in methanol with reference to the method for measuring the above-described content of the specific color-forming agent. The above-described specific acid generator is detected at the maximal absorption wavelength of the above-described specific acid generator to be detected, the above-described specific color-forming agent is detected at the maximal absorption wavelength of the above-described specific color-forming agent to be detected, and the mass ratio thereof is obtained.

<Production Method of Microcapsule>

Examples of a production method of the microcapsule include known methods such as an interfacial polymerization method, an internal polymerization method, a phase separation method, an external polymerization method, and a coacervation method.

As an example of the production method of the microcapsule, a method including the following emulsification step and encapsulation step can be mentioned. In the encapsulation step, it is preferable to form a resin wall (capsule wall) by an interfacial polymerization method.

Emulsification step: a step of mixing the specific color-forming agent, the specific acid generator, the solvent, and an emulsifier in water to prepare an emulsified liquid Encapsulation step: a step of forming a resin wall (capsule wall) around an oil droplet including the specific color-forming agent, the specific acid generator, and the solvent in the emulsified liquid obtained in the emulsification step to encapsulate the oil droplet Hereinafter, the interfacial polymerization method as the example of the production method of the microcapsule, in which the capsule wall is polyurea or polyurethane urea, will be described.

The interfacial polymerization method is preferably an interfacial polymerization method including a step (emulsification step) of dispersing an oil phase, which contains the specific acid generator, a solvent, a solvent having a boiling point of lower than 100° C. (hereinafter, also referred to as "solvent for producing a capsule"), the specific acid generator, and a capsule wall material (for example, polyisocyanate or the like), in a water phase which contains an emulsifier to prepare an emulsified liquid; and a step (encapsulation step) of forming a capsule wall by polymerizing the capsule wall material at an interface between the oil phase and the water phase, and forming a microcapsule containing the specific acid generator, the solvent, and the specific color-forming agent.

In the above-described emulsification step, the solvent for producing a capsule is usually a component which can be added for the purpose of improving solubility of the core material in the solvent. The solvent for producing a capsule is removed by a drying treatment in a method for forming an ultraviolet-sensing layer, which will be described later. Therefore, it is preferable that the microcapsule in the ultraviolet inspection tool does not contain the solvent for producing a capsule.

Examples of the solvent for producing a capsule include ethyl acetate (boiling point: 77° C.), isopropyl acetate (boiling point: 89° C.), methyl ethyl ketone (boiling point: 80° C.), and methylene chloride (boiling point: 40° C.).

The solvent for producing a capsule may be used alone or in combination of two or more kinds thereof.

Examples of the type of the emulsifier used in the above-described emulsification step include a dispersant and a surfactant.

Examples of the dispersant include water-soluble polymers selected from the group consisting of known anionic polymers, non-ionic polymers, and amphoteric polymer, and specific examples thereof include polyvinyl alcohol, gelatin, and cellulose derivative. Among these, polyvinyl alcohol is preferably used.

Examples of the surfactant include the surfactant in the first embodiment of the ultraviolet inspection tool.

In addition, examples of another production method of the microcapsule include methods described in U.S. Pat. Nos. 3,726,804A and 3,796,696A, the contents of which are incorporated in the present specification.

A content of the microcapsule in the ultraviolet-sensing layer is preferably 50% to 99% by mass and more preferably 60% to 90% by mass with respect to the total mass of the ultraviolet-sensing layer.

A content (coating amount of solid content) of the microcapsule in the ultraviolet-sensing layer is also preferably 0.1 to 30 g/m² per unit area of the ultraviolet-sensing layer. The lower limit thereof is preferably 0.5 g/m 2 or more, and more preferably 1 g/m 2 or more. The upper limit thereof is preferably 25 g/m 2 or less, and more preferably 20 g/m 2 or less.

The ultraviolet-sensing layer may contain a component other than the above-described microcapsule.

Examples of other components include a binder, a reducing agent, a light stabilizer, a crosslinking agent, a sensitizer, a colorant, an ultraviolet absorber, and a surfactant.

Examples of the binder include the binder in the first embodiment of the ultraviolet inspection tool.

As the reducing agent, the sensitizer, and the surfactant, description in lower left column of page 9 to upper left column of page 10 in JP1989-207741A (JP-H1-207741A) and in paragraphs 0038, 0039, and 0048 to 0059 of JP2004-233614A can be referred to, the contents of which are incorporated in the present specification.

In addition, as the reducing agent, the light stabilizer, the ultraviolet absorber, and the surfactant, the reducing agent, the light stabilizer, the ultraviolet absorber, and the surfactant, which can be contained in the microcapsule, can also be used.

A mass (coating amount of solid content) per unit area of the ultraviolet-sensing layer is preferably 0.1 to 30 g/m², more preferably 0.5 to 25 g/m², and still more preferably 1 to 10 g/m².

A thickness of the ultraviolet-sensing layer is preferably 0.1 to 30 μm, more preferably 0.5 to 25 μm, and still more preferably 1 to 10 μm.

<Method for Forming Ultraviolet-Sensing Layer>

Examples of a method for forming the above-described ultraviolet-sensing layer include known methods.

Examples thereof include a method of applying a composition for forming an ultraviolet-sensing layer, which contains the above-described microcapsule, onto a support, and as necessary, drying the coating film.

Examples of a specific procedure of the above-described method using the composition for forming an ultraviolet-sensing layer, containing the microcapsule include the procedure of the method for forming an ultraviolet-sensing layer in the first embodiment of the ultraviolet inspection tool.

[Ultraviolet Inspection Kit]

The present invention also relates to an ultraviolet inspection kit including the above-described ultraviolet inspection tool.

The ultraviolet inspection kit includes at least the above-described ultraviolet inspection tool.

Examples of a specific configuration of the ultraviolet inspection kit include an aspect of including the ultraviolet inspection tool and other elements selected from the group consisting of a member having a filter layer which selectively transmits light having a specific wavelength (preferably a filter sheet which shields light having a wavelength of 300 nm or more), a light shielding bag (ultraviolet cut bag), a sample judgment, a limit sample (calibration sheet), a condensing jig such as a lens and a concave mirror, and a holding member which holds the ultraviolet inspection tool.

The above-described holding member may have an opening portion for irradiating the held ultraviolet inspection tool with ultraviolet rays, or the holding member and a determination sample may be integrated.

[Ultraviolet Inspection Method]

The present invention also relates to an ultraviolet inspection method of inspecting ultraviolet rays with a wavelength of 180 to 230 nm using the above-described ultraviolet inspection tool.

EXAMPLES

Hereinafter, the features of the present invention will be more specifically described using Examples and Comparative Examples. The materials, the amounts of materials used, the proportions, the treatment details, the treatment procedure, and the like shown in Examples below may be modified as appropriate as long as the modifications do not depart from the spirit of the present invention. Accordingly, the scope of the present invention should not be construed as being limited by the specific examples given below. "%" and "part" are based on mass unless otherwise specified.

[Production of Ultraviolet Inspection Tool]

Example 1

A mixed solution 1 having the following composition was added to a 5% by mass aqueous solution (202 parts) of polyvinyl alcohol, and then emulsified and dispersed at 20° C. to obtain an emulsified liquid having a volume average particle size of 1 μm. Further, the obtained emulsified liquid was continuously stirred at 50° C. for 4 hours. Further, water was added thereto to adjust the concentration of solid contents, thereby obtaining a 21.2% by mass of microcapsule dispersion liquid containing a color-forming agent.

<Composition of Mixed Solution 1>

Color-forming agent: color-forming agent A, 3,3-bis(2-methyl-1-octyl-3-indolyl)phthalide (manufactured by BASF) (2.6 parts)

Acid generator: BMPS, tribromomethylphenylsulfone (manufactured by SUMITOMO SEIKA CHEMICALS CO., LTD.) (10 parts)

Microcapsule-contained solvent: TCP, tricresyl phosphate (manufactured by DAIHACHI CHEMICAL INDUSTRY CO., LTD.) (23 parts)

Solvent for producing microcapsule: ethyl acetate (manufactured by SHOWA DENKO K.K.) (50 parts)

Light stabilizer: 2,5-bis(1,1,3,3-tetramethylbutyl)hydroquinone (manufactured by TOKYO CHEMICAL INDUSTRY CO., LTD.) (0.03 parts)

Microcapsule wall forming material: D-110 N ("TAKENATE D-110N", manufactured by Mitsui Chemicals, Inc., 75% by mass ethyl acetate solution) (31 parts)

The obtained microcapsule dispersion liquid (20 parts), a 6% by mass aqueous solution of polyvinyl alcohol (product name "Denka Size EP-130", manufactured by Denka Company Limited.) (5 parts), glyoxal (manufactured by Daito Chemical Co., Ltd.) (0.05 parts), and a 50% by mass aqueous solution of sodium dodecylbenzenesulfonate (manufactured by DKS Co., Ltd.) (0.09 parts) were mixed with each other to produce a composition for forming an ultraviolet-sensing layer.

The obtained composition for forming an ultraviolet-sensing layer was applied onto a support of a white polyethylene terephthalate sheet ("CRISPER K1212", manufactured by Toyobo Co., Ltd.) having a thickness of 188 μm with an amount of liquid applied of 21 mL/m$^2$, and then heated and dried at 105° for 1 minute to produce an ultraviolet inspection tool including the support and the ultraviolet-sensing layer. A coating amount of solid content of the ultraviolet-sensing layer was 3 g/m$^2$ per unit area of the ultraviolet-sensing layer, and a thickness of the ultraviolet-sensing layer was 3 μm.

Examples 2 to 12 and Comparative Example 2

Ultraviolet inspection tools of Examples 2 to 12 and Comparative Example 2 were produced by the same method as in Example 1, except that the type of components, formulation amount, concentration of solid contents, and color-forming agent content per unit area of the ultraviolet-sensing layer were changed as shown in Table 1.

Example 13

An ultraviolet inspection tool of Example 13 was produced by the same method as in Example 1, except that the tricresyl phosphate (23 parts) was changed to tricresyl phosphate (17 parts) and phenylxylylethane (SAS-296: "Nisseki Hisol SAS296", manufactured by J X Nippon Oil and Energy Corp) (6 parts) and the formulation amount was changed as shown in Table 1.

Example 14

An ultraviolet inspection tool of Example 14 was produced by the same method as in Example 1, except that the tricresyl phosphate (23 parts) was changed to tricresyl phosphate (23 parts) and phenylxylylethane (SAS-296: "Nisseki Hisol SAS296", manufactured by JX Nippon Oil and Energy Corp) (7 parts) and the formulation amount and concentration of solid contents were changed as shown in Table 1.

Comparative Example 1

An ultraviolet inspection tool of Comparative Example 1 was produced by the same method as in Example 1, except that the mixed solution 1 was changed to a mixed solution C1 with reference to a radiation-sensitive composition No. 14 of JP2001-242249A.

<Composition of Mixed Solution C1>

Color-forming agent: color-forming agent F, crystal violet lactone (manufactured by TOKYO CHEMICAL INDUSTRY CO., LTD.) (0.2 parts)

Acid generator: BMPS, tribromomethylphenylsulfone (manufactured by SUMITOMO SEIKA CHEMICALS CO., LTD.) (10 parts)

Microcapsule-contained solvent: 1-octanol (manufactured by FUJIFILM Wako Pure Chemical Corporation) (14 parts)

Microcapsule-contained solvent: xylene (manufactured by FUJIFILM Wako Pure Chemical Corporation) (7 parts)

Solvent for producing microcapsule: ethyl acetate (manufactured by SHOWA DENKO K.K.) (50 parts)

Light stabilizer: 2,5-bis(1,1,3,3-tetramethylbutyl)hydroquinone (manufactured by TOKYO CHEMICAL INDUSTRY CO., LTD.) (0.03 parts)

Microcapsule wall forming material: D-110 N ("TAKENATE D-110N", manufactured by Mitsui Chemicals, Inc., 75% by mass ethyl acetate solution) (31 parts)

Example 15

50 parts by mass of polyvinyl butyral (solid content: 100% by mass), 300 parts by mass of tetrahydrofuran, and 68.2 parts by mass of ethanol were mixed to dissolve polyvinyl butyral. 10.0 parts by mass of tribromomethylphenylsulfone (manufactured by SUMITOMO SEIKA CHEMICALS CO., LTD.) and 5.0 parts by mass of 3,3-bis(2-methyl-1-octyl-3-indolyl)phthalide (manufactured by BASF) were added to the obtained polyvinyl butyral solution and dissolved. The obtained composition for forming an ultraviolet-sensing layer was applied onto a white polyethylene terephthalate sheet (product name "CRISPER K1212", manufactured by Toyobo Co., Ltd.) having a thickness of 188 μm so that a film thickness after drying was 5 μm, and then dried to produce an ultraviolet inspection tool including the support and the ultraviolet-sensing layer.

Examples 16 to 20

Ultraviolet inspection tools of Examples 16 to 20 were produced by the same method as in Example 15, except that the type of components, formulation amount, and color-forming agent content per unit area of the ultraviolet-sensing layer were changed as shown in Table 1.

Example 21 parts by mass of an acrylic resin 1 (acrylic acid/ethyl acrylate/methyl methacrylate=13/40/47, acid value: 100 mgKOH/g, 1-methoxy-2-propanol solution, solid content: 38.8% by mass), 10.0 parts by mass of tribromomethylphenylsulfone (manufactured by SUMITOMO SEIKA CHEMICALS CO., LTD.), 5.0 parts by mass of 3,3-bis(2-methyl-1-octyl-3-indolyl)phthalide (manufactured by BASF), and 10.2 parts by mass of methyl ethyl ketone were mixed and dissolved. The obtained composition for forming an ultraviolet-sensing layer was applied onto a white polyethylene terephthalate sheet (product name "CRISPER K1212", manufactured by Toyobo Co., Ltd.) having a thickness of 188 μm so that a film thickness after drying was 5 μm, and then dried to produce an ultraviolet inspection tool including the support and the ultraviolet-sensing layer.

Comparative Example 3

An ultraviolet inspection tool of Comparative Example 3 was produced by the same method as in Example 15, except that the components and formulation amount were changed as shown in Table 2 with reference to Example 5 of JP1987-112020A (JP-S62-112020A).

Each component shown in Tables 1 and 2 is as follows.

In Tables 1 and 2, the numerical value in parentheses described together with the component name means a content (part by mass).

[Microcapsule-Contained Solvent]
- TCP (tricresyl phosphate, manufactured by DAIHACHI CHEMICAL INDUSTRY CO., LTD., boiling point: 231° C. to 255° C.)
- SAS-296 (phenylxylylethane, "Nisseki Hisol SAS296", manufactured by JX Nippon Oil and Energy Corp, boiling point: 290° C. to 305° C.)
- 1-Octanol (manufactured by FUJIFILM Wako Pure Chemical Corporation)
- Xylene (manufactured by FUJIFILM Wako Pure Chemical Corporation)

[Acid Generator]
- BMPS: tribromomethylphenylsulfone (molecular weight: 393, manufactured by SUMITOMO SEIKA CHEMICALS CO., LTD.)
- PAG-A: tri-p-tolylsulfonium hexafluorophosphate (molecular weight: 450, manufactured by TOKYO CHEMICAL INDUSTRY CO., LTD.)
- PAG-B: p-octyloxyphenyl-2,4,6-trimethoxyphenyliodonium hexafluorophosphate (molecular weight: 644)

[Color-Forming Agent]
- Color-forming agent A: 3,3-bis(2-methyl-1-octyl-3-indolyl)phthalide (manufactured by BASF)
- Color-forming agent B: rhodamine B base (manufactured by KANTO KAGAKU)
- Color-forming agent C: 3',6'-bis(diethylamino)-2-(4-nitrophenyl)spiro[isoindole-1,9'-xanthene]-3-one (Pink-DCF, manufactured by Hodogaya Chemical Co., Ltd.)
- Color-forming agent D: 6'-(ethylisobutylamino)-2'-anilino-3'-methylspiro[isobenzofuran-1(3H), 9'-[9H]xanthen]-3-on
- Color-forming agent E: 6'-(diethylamino)-1',3'-dimethylfluorane (Orange-DCF, manufactured by Hodogaya Chemical Co., Ltd.)
- Color-forming agent F: 6-(dimethylamino)-3,3-bis[4-(dimethylamino)phenyl]phthalide (crystal violet lactone, manufactured by TOKYO CHEMICAL INDUSTRY CO., LTD.)
- Color-forming agent G: 6'-(diethylamino)-1',2'-benzofluorane (manufactured by FUJIFILM Wako Pure Chemical Corporation)

[Microcapsule Wall Forming Material]
- D-110N (adduct of xylylene-1,3-diisocyanate and trimethylolpropane, product name "TAKENATE D-110N", manufactured by Mitsui Chemicals, Inc., 75% by mass ethyl acetate solution)

[Binder]
- PVB: polyvinyl butyral (manufactured by SEKISUI CHEMICAL CO., LTD.)
- Acrylic resin 1: acrylic acid/ethyl acrylate/methyl methacrylate=13/40/47, molecular weight: 10,000

[Evaluation]

[Evaluation of color formability with respect to light having wavelength of 222 nm]

Using Care 222 (registered trademark), the ultraviolet-sensing layer of the ultraviolet inspection tool of each Example and each Comparative Example was irradiated with light having a wavelength of 222 nm until an irradiation amount reached 3 mJ/cm 2.

Thereafter, using a spectrophotometer Spectrolino (manufactured by GretagMacbeth AG), CIE L*a*b* of the ultraviolet inspection tool before the light irradiation and the ultraviolet inspection tool after the light irradiation were measured, respectively, and a distance before the light irradiation and after the light irradiation was obtained in the L*a*b* coordinate system and defined as ΔE. As measurement conditions, an illumination type of D65, an observation visual field of 2°, and a density standard of ANSI STATUS A were used. In addition, in each Example and each Comparative Example, a ring-opened compound derived from the specific color-forming agent was confirmed in each ultraviolet inspection tool after the evaluation.

[Evaluation of Tint]

The ultraviolet-sensing layer was irradiated with ultraviolet rays under the same conditions as in [Evaluation of color formability with respect to light having wavelength of 222 nm] described above.

Thereafter, using a spectrophotometer Spectrolino (manufactured by GretagMacbeth AG), CIE L*a*b* of the ultraviolet inspection tool after the light irradiation was measured to measure the L*a*b* coordinate system. As measurement conditions, an illumination type of D65, an observation visual field of 2°, and a density standard of ANSI STATUS A were used. a* and b* are shown in the tables.

[Color Evaluation without Irradiation]

The degree of color of the ultraviolet inspection tool produced in each Example and each Comparative Example was visually confirmed immediately after the production and in a state before performing [Evaluation of color formability with respect to light having wavelength of 222 nm] described above.

A: a case where the color was the same as that of the support or a case where the ultraviolet inspection tool was slightly colored but within the allowable range B: a case where the color was clearly different from that of the support

[Evaluation of Visibility]

Visibility was evaluated based on the following evaluation standard using each of the evaluation results obtained above A: all of "ΔE" of 10.0 or more, "color evaluation without irradiation" of A, and "a* of tint" of more than 0 were satisfied.

B: one or two of "ΔE" of 10.0 or more, "color evaluation without irradiation" of A, and "a* of tint" of more than 0 were satisfied, but a case of "ΔE" of less than 5.0 was excluded.

C: "ΔE" was less than 5.0.

In the tables, each notation indicates the following.

The column of "Specific acid generator/specific color-forming agent" indicates the mass ratio of the content of the specific acid generator to the content of the specific color-forming agent.

The column of "Content of specific color-forming agent/area of ultraviolet-sensing layer (g/m²)" indicates the content of the color-forming agent per unit area of the ultraviolet-sensing layer (g/m²).

The value in parentheses described together with the type of each component indicates the content (part by mass) of each component.

TABLE 1

| | Composition for forming microcapsule | | | | Specific acid generator/specific color-forming agent (mass ratio) | Concentration of solid contents of microcapsule dispersion liquid (% by mass) |
|---|---|---|---|---|---|---|
| | Microcapsule-contained solvent | Acid generator | Color-forming agent | Microcapsule wall forming material | | |
| Example 1 | TCP | BMPS (10) | Color-forming agent A (2.6) | D-110N (31) | 3.85 | 21.2 |
| Example 2 | TCP | BMPS (10) | Color-forming agent A (2.6) | D-110N (8) | 3.85 | 16.4 |
| Example 3 | TCP | BMPS (10) | Color-forming agent A (1.3) | D-110N (31) | 7.69 | 20.9 |
| Example 4 | TCP | BMPS (10) | Color-forming agent A (0.7) | D-110N (8) | 14.29 | 15.9 |
| Example 5 | TCP | BMPS (10) | Color-forming agent A (0.4) | D-110N (8) | 25.00 | 15.8 |
| Example 6 | TCP | BMPS (10) | Color-forming agent A (0.3) | D-110N (8) | 33.33 | 15.8 |
| Example 7 | FCP | BMPS (10.0) | Color-forming agent B (0.5) | D-110N (31) | 20.00 | 15.9 |
| Example 8 | FCP | BMPS (2.5) | Color-forming agent B (0.5) | D-110N (31) | 5.00 | 13.3 |
| Example 9 | TCP | BMPS (10) | Color-forming agent C (0.7) | D-110N (8) | 14.29 | 15.9 |
| Example 10 | TCP | BMPS (10) | Color-forming agent D (0.7) | D-110N (8) | 14.29 | 15.9 |
| Example 11 | TCP | BMPS (10) | Color-forming agent E (0.7) | D-110N (8) | 14.29 | 15.9 |
| Example 12 | TCP | PAG-A (2.7) | Color-forming agent A (2.6) | D-110N (8) | 1.04 | 15.9 |
| Example 13 | TCP/SAS-296 | BMPS (5) | Color-forming agent A (2.6) | D-110N (31) | 2.01 | 21.2 |
| Example 14 | TCP/SAS-296 | BMPS (2.7) | Color-forming agent A (2.6) | D-110N (31) | 1.04 | 21.4 |
| Comparative Example 1 | 1-Octanol/Xylene | BMPS (10) | Color-forming agent F (0.2) | D-110N (31) | 50.00 | 21.2 |
| Comparative Example 2 | TCP | PAG-B (2.7) | Color-forming agent A (2.6) | D-110N (8) | — | 15.9 |

| | Content of specific color-forming agent/area of ultraviolet-sensing layer (g/m²) | Evaluation | | | | |
|---|---|---|---|---|---|---|
| | | Color formability (wavelength of 222 nm) ΔE | Tint a | b* | Color evaluation without irradiation | Visibility |
| Example 1 | 0.14 | 33.4 | 25.5 | −12.7 | A | A |
| Example 2 | 0.14 | 44.9 | 34.6 | −16.8 | A | A |
| Example 3 | 0.07 | 33.8 | 25.8 | −12.9 | A | A |
| Example 4 | 0.03 | 44.4 | 34.2 | −16.7 | A | A |
| Example 5 | 0.02 | 38.3 | 29.4 | −14.5 | A | A |
| Example 6 | 0.02 | 32.6 | 24.9 | −12.5 | A | A |
| Example 7 | 0.03 | 23.7 | 23.5 | −11.8 | B | B |
| Example 8 | 0.03 | 30.6 | 30.6 | −15.0 | B | B |
| Example 9 | 0.03 | 20.7 | 11.5 | −0.6 | A | A |
| Example 10 | 0.03 | 21.3 | −9.8 | 7.3 | A | B |
| Example 11 | 0.03 | 9.2 | 7.2 | 4.2 | A | B |
| Example 12 | 0.14 | 7.9 | 5.4 | −3.7 | A | B |
| Example 13 | 0.14 | 28.1 | 21.3 | −10.9 | A | A |
| Example 14 | 0.14 | 25.0 | 18.9 | −9.8 | A | A |
| Comparative Example 1 | 0.01 | 3.2 | −4.9 | 0.1 | A | C |
| Comparative Example 2 | 0.14 | 3.5 | 1.9 | −2.1 | A | C |

TABLE 2

| | Composition for forming ultraviolet-sensing tool | | | Specific acid generator/ specific color-forming agent (mass ratio) | Content of specific color-forming agent/area of ultraviolet-sensing layer (g/m²) | Evaluation | | | | |
|---|---|---|---|---|---|---|---|---|---|---|
| | | | | | | Color formability (wavelength of 222 nm) ΔE | Tint a* | Tint b* | Color evaluation without irradiation | Visibility |
| | Binder | Acid generator | Color-forming agent | | | | | | | |
| Example 15 | PVB (50) | BMPS (10.0) | Color-forming agent A (5.0) | 2.00 | 0.53 | 32.5 | 24.2 | −11.4 | A | A |
| Example 16 | PVB (50) | BMPS (5.0) | Color-forming agent A (4.0) | 1.25 | 0.41 | 31.1 | 22.9 | −10.8 | A | A |
| Example 17 | PVB (50) | BMPS (10.0) | Color-forming agent A (2.0) | 5.00 | 0.19 | 35.5 | 26.8 | −12.8 | A | A |
| Example 18 | PVB (50) | BMPS (10.0) | Color-forming agent A (1.0) | 10.00 | 0.10 | 37.3 | 28.4 | −13.6 | A | A |
| Example 19 | PVB (50) | BMPS (2.0) | Color-forming agent A (1.0) | 2.00 | 0.10 | 37.8 | 28.9 | −13.9 | A | A |
| Example 20 | PVB (50) | BMPS (3.0) | Color-forming agent E (2.5) | 1.20 | 0.24 | 9.5 | 7.5 | 4.5 | A | B |
| Example 21 | Acrylic resin 1 (50) | BMPS (10.0) | Color-forming agent A (5.0) | 2.00 | 0.50 | 17.6 | 10.9 | −4.6 | B | B |
| Comparative Example 3 | PVB (20) | BMPS (5.0) | Color-forming agent G (5.0) | 1.00 | 0.10 | 4.2 | −0.2 | 1.6 | A | C |

As shown in the above tables, it was confirmed that the ultraviolet inspection tool according to the embodiment of the present invention exhibited a desired effect.

In a case where the color-forming agent included at least one selected from the group consisting of the compound represented by Formula (I), the compound represented by Formula (II), and the ring-opened compound of these compounds, it was confirmed that at least one effect of the color formability with respect to light having a wavelength of 222 nm with a low irradiation amount, the color evaluation without irradiation, and the visibility was more excellent (comparison between Examples 1 to 11, comparison between Examples 15 to 20, and the like).

In a case where the specific acid generator included the compound represented by Formula (1), it was confirmed that the color formability with respect to light having a wavelength of 222 nm with a low irradiation amount was more excellent (comparison between Examples 14 and 12, and the like).

In a case where the ultraviolet inspection tool contains a binder and the binder was a resin having a hydroxyl group, it was confirmed that at least one effect of the color formability with respect to light having a wavelength of 222 nm with a low irradiation amount, the color evaluation without irradiation, and the visibility was more excellent (comparison between Examples 15 to 21, and the like).

EXPLANATION OF REFERENCES

10: ultraviolet inspection tool
12: support
14: ultraviolet-sensing layer

What is claimed is:
1. An ultraviolet inspection tool comprising:
   an ultraviolet-sensing layer containing a color-forming agent and an acid generator,
   wherein the color-forming agent has at least one selected from the group consisting of a lactone structure, a lactam structure, a sultone structure, a sultine structure, a ring-opened structure of these structures, and an azobenzene structure,
   a molecular weight of the acid generator is 600 or less, and
   a mass ratio of a content of the acid generator to a content of the color-forming agent is 1.04 to 40.00.
2. The ultraviolet inspection tool according to claim 1,
   wherein the color-forming agent includes at least one selected from the group consisting of a compound represented by Formula (I), a compound represented by Formula (II), and a ring-opened compound of these compounds,

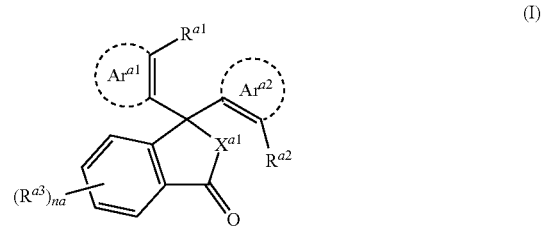

(I)

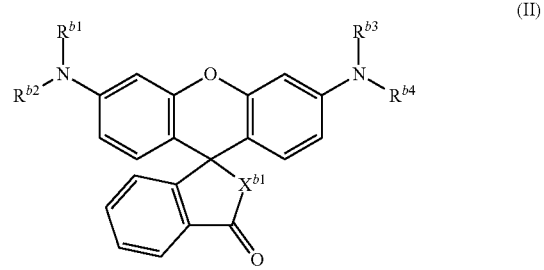

(II)

in Formula (I), $Ar^{a1}$ and $Ar^{a2}$ each independently represent an aromatic ring which may have a substituent, $R^{a1}$ and $R^{a2}$ each independently represent an alkyl group which may have a substituent, $R^{a3}$ represents a substituent, $X^{a1}$ represents —O— or —$NR^{a4}$—, $R^{a4}$ represents a hydrogen atom, an alkyl group which may have a substituent, or an aryl group which may have a substituent, and na represents an integer of 0 to 4, in Formula (II), $R^{b1}$ to $R^{b3}$ each independently represent a hydrogen atom, an alkyl group which may have a substituent, or an aryl group which may have a substituent, $R^{b2}$ and $R^{b4}$ each independently represent an alkyl group which may have a substituent or an aryl group which may have a substituent, $X^{b1}$ represents —$NR^{b5}$—, and $R^{b5}$ represents a hydrogen atom, an alkyl group which may have a substituent, or an aryl group which may have a substituent.

3. The ultraviolet inspection tool according to claim 1,
wherein the color-forming agent includes at least one selected from the group consisting of a compound represented by Formula (I), a compound represented by Formula (III), and a ring-opened compound of these compounds, and
the mass ratio of the content of the acid generator to the content of the color-forming agent is 2.01 to 40.00,

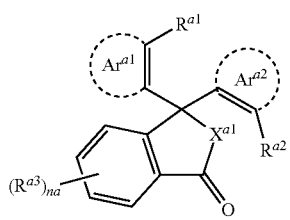
(I)

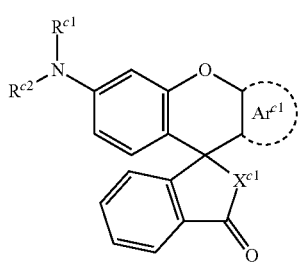
(III)

in Formula (I), $Ar^{a1}$ and $Ar^{a2}$ each independently represent an aromatic ring which may have a substituent, $R^{a1}$ and $R^{a2}$ each independently represent an alkyl group which may have a substituent, $R^{a3}$ represents a substituent, $X^{a1}$ represents —O— or —$NR^{a4}$—, $R^{a4}$ represents a hydrogen atom, an alkyl group which may have a substituent, or an aryl group which may have a substituent, and na represents an integer of 0 to 4, in Formula (III), $Ar^{c1}$ represents an aromatic ring which may have a substituent, $R^{c1}$ represents a hydrogen atom, an alkyl group which may have a substituent, or an aryl group which may have a substituent, $R^{c2}$ represents an alkyl group which may have a substituent or an aryl group which may have a substituent, $X^{c1}$ represents —O— or —$NR^{c3}$—, and $R^{c3}$ represents a hydrogen atom, an alkyl group which may have a substituent, or an aryl group which may have a substituent.

4. The ultraviolet inspection tool according to claim 1,
wherein the color-forming agent includes at least one selected from the group consisting of a compound represented by Formula (IV) or a ring-closed compound of the compound, and a compound represented by Formula (V),

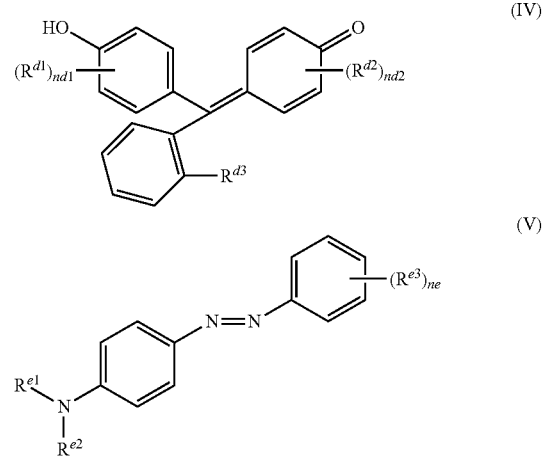

in Formula (IV), $R^{d1}$ and $R^{d2}$ each independently represent a halogen atom or an alkyl group which may have a substituent, $R^{d3}$ represents $COO^-M_d^+$ or $SO_3^-M_d^+$, $M_d^+$ represents a cation, and nd1 and nd2 each independently represent an integer of 0 to 4, in Formula (V), $R^{e1}$ and $R^{e2}$ each independently represent an alkyl group which may have a substituent, $R^{e3}$ represents $COO^-M_e^+$ or $SO_3^{+M_e^+}$, $M_e^+$ represents a cation, and ne represents 0 or 1.

5. The ultraviolet inspection tool according to claim 1,
wherein the acid generator includes a compound which generates at least one acid selected from the group consisting of HBr, HI, $HPF_6$, $HSbF_6$, and perfluorosulfonic acid.

6. The ultraviolet inspection tool according to claim 1,
wherein the acid generator includes at least one selected from the group consisting of an organic halogen compound, a sulfonium salt compound, and an iodonium salt compound.

7. The ultraviolet inspection tool according to claim 6,
wherein the acid generator includes at least one selected from the group consisting of a compound represented by Formula (1) and a triarylsulfonium salt compound, $$R^1\text{-}L^1\text{-}CX^1X^2X^3 \qquad (1)$$

in Formula (1), $R^1$ represents an aryl group which may have a substituent or a heteroaryl group which may have a substituent, $L^1$ represents —SO— or —$SO_2$—, and $X^1$ to $X^3$ each independently represent a hydrogen atom or a halogen atom, where all of $X^1$ to $X^3$ are not hydrogen atoms at the same time.

8. The ultraviolet inspection tool according to claim 1,
wherein the color-forming agent has a maximal absorption wavelength in a wavelength range of 200 to 230 nm.

9. The ultraviolet inspection tool according to claim 1,
wherein the mass ratio of the content of the acid generator to the content of the color-forming agent is 3.00 to 35.00.

10. The ultraviolet inspection tool according to claim 1,
further comprising:
a binder,
wherein the binder substantially has no aromatic ring.

11. The ultraviolet inspection tool according to claim 1,
wherein the ultraviolet-sensing layer further contains a microcapsule, and the microcapsule contains the color-forming agent and the acid generator.

12. The ultraviolet inspection tool according to claim 1, wherein a content of the color-forming agent is 0.010 to 1.000 g/m$^2$ per unit area of the ultraviolet-sensing layer.

13. The ultraviolet inspection tool according to claim 1, wherein the ultraviolet inspection tool senses ultraviolet rays with a wavelength of 180 to 230 nm.

14. An ultraviolet inspection kit comprising:
the ultraviolet inspection tool according to claim 1.

15. An ultraviolet inspection method comprising:
inspecting ultraviolet rays with a wavelength of 180 to 230 nm using the ultraviolet inspection tool according to claim 1.

16. The ultraviolet inspection tool according to claim 2, wherein the acid generator includes a compound which generates at least one acid selected from the group consisting of HBr, HI, HPF$_6$, HSbF$_6$, and perfluorosulfonic acid.

17. The ultraviolet inspection tool according to claim 2, wherein the acid generator includes at least one selected from the group consisting of an organic halogen compound, a sulfonium salt compound, and an iodonium salt compound.

18. The ultraviolet inspection tool according to claim 17, wherein the acid generator includes at least one selected from the group consisting of a compound represented by Formula (1) and a triarylsulfonium salt compound, $$R^1\text{-}L^1\text{-}CX^1X^2X^3 \qquad (1)$$

in Formula (1), $R^1$ represents an aryl group which may have a substituent or a heteroaryl group which may have a substituent, $L^1$ represents —SO— or —SO$_2$—, and $X^1$ to $X^3$ each independently represent a hydrogen atom or a halogen atom, where all of $X^1$ to $X^3$ are not hydrogen atoms at the same time.

19. The ultraviolet inspection tool according to claim 2, wherein the color-forming agent has a maximal absorption wavelength in a wavelength range of 200 to 230 nm.

20. The ultraviolet inspection tool according to claim 2, wherein the mass ratio of the content of the acid generator to the content of the color-forming agent is 3.00 to 35.00.

* * * * *